Nov. 7, 1961 G. E. HAGEN ET AL 3,007,639
DIGITAL DIFFERENTIAL ANALYZERS
Filed Nov. 6, 1953 9 Sheets-Sheet 1

INVENTORS
ROBERT M. BECK
JOSEPH A. BEEK, JR.
GLENN E. HAGEN
BY CECIL R. RUSSELL
CHARLES R. WILLIAMS
Herbert E. Metcalf
ATTORNEY Nov. 7, 1961          G. E. HAGEN ET AL          3,007,639
DIGITAL DIFFERENTIAL ANALYZERS Filed Nov. 6, 1953          9 Sheets-Sheet 2

INVENTORS
ROBERT M. BECK
JOSEPH A. BEEK, JR.
GLENN E. HAGEN
CECIL R. RUSSELL
CHARLES R. WILLIAMS

BY *Herbert E. Metcalf*
ATTORNEY

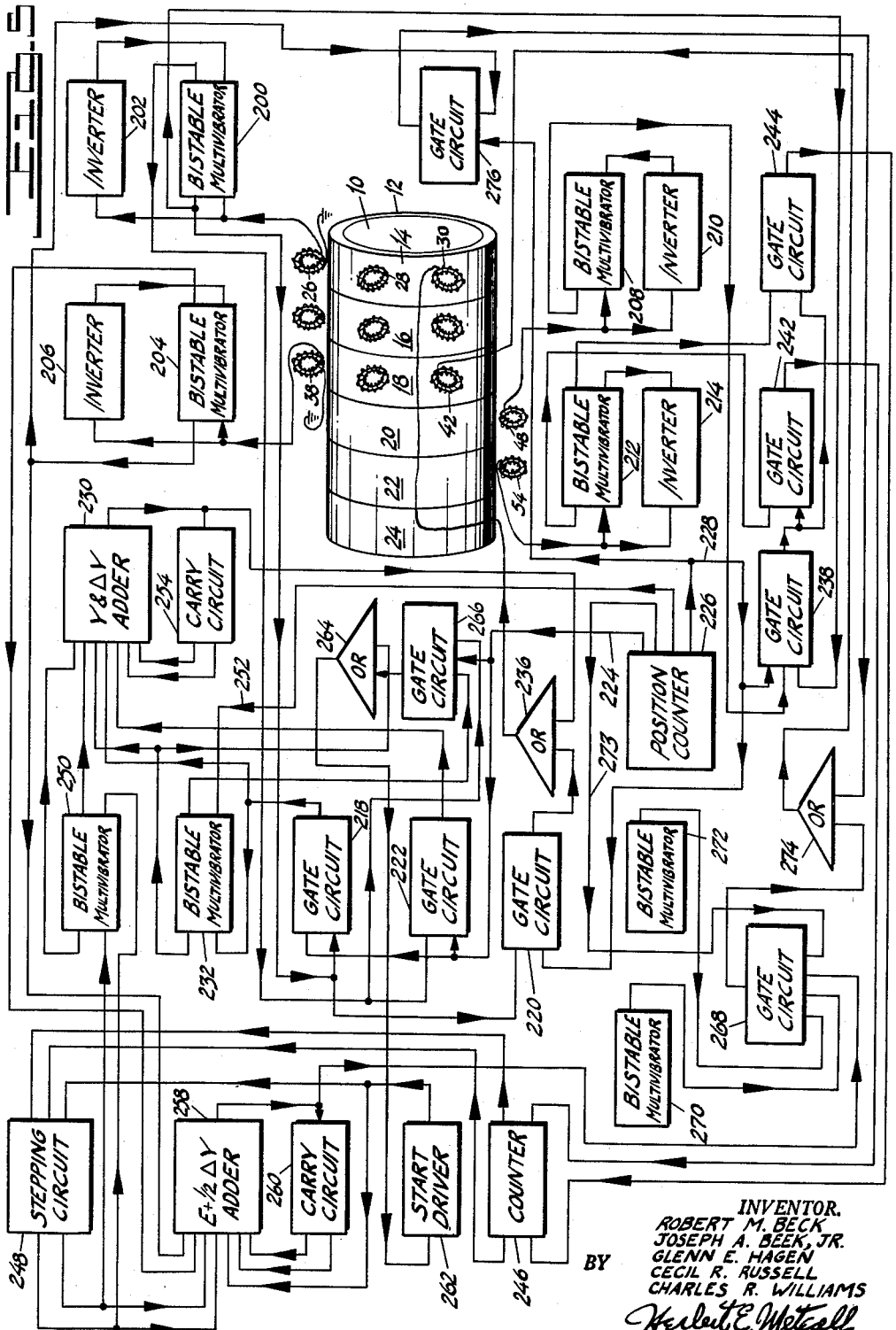

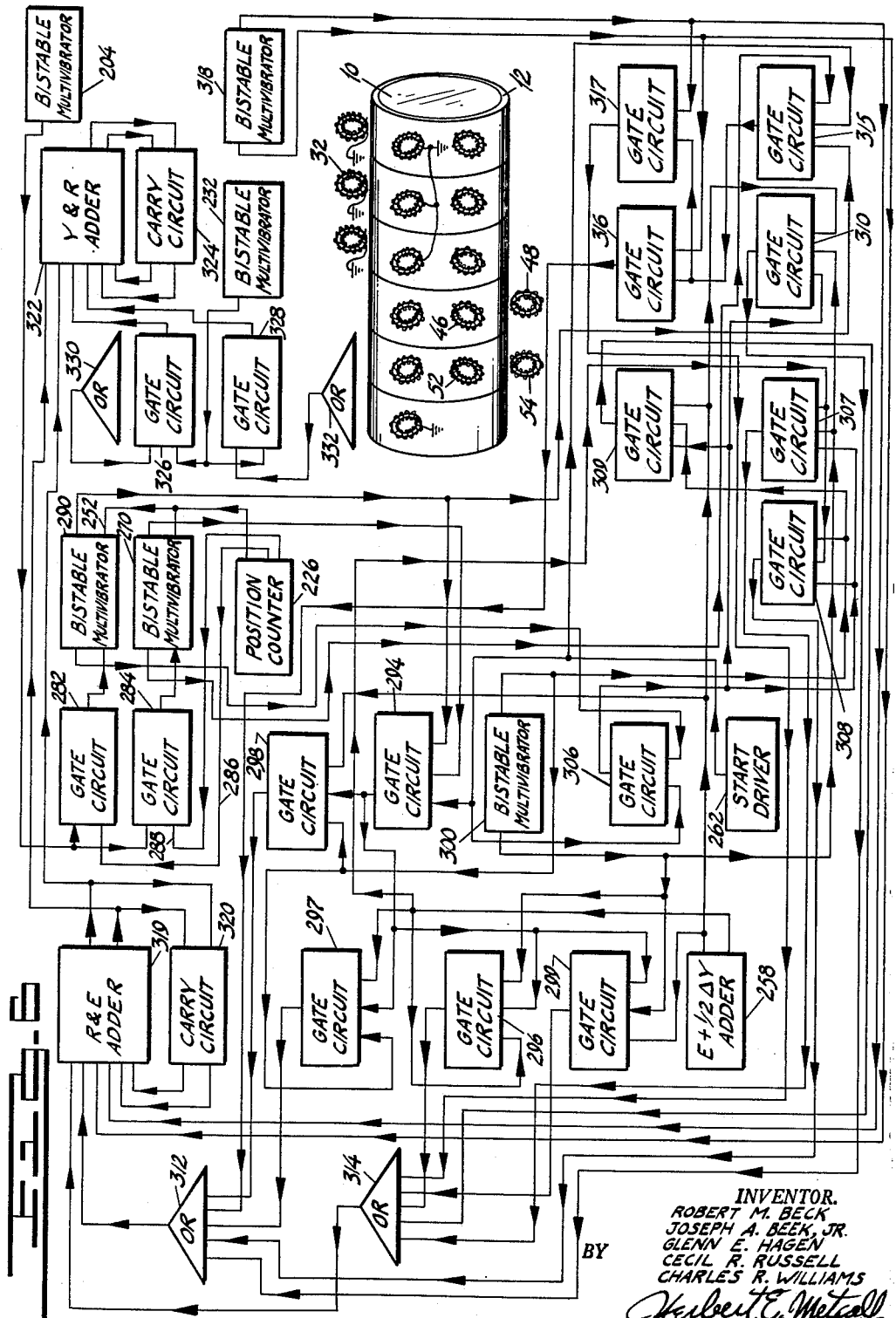

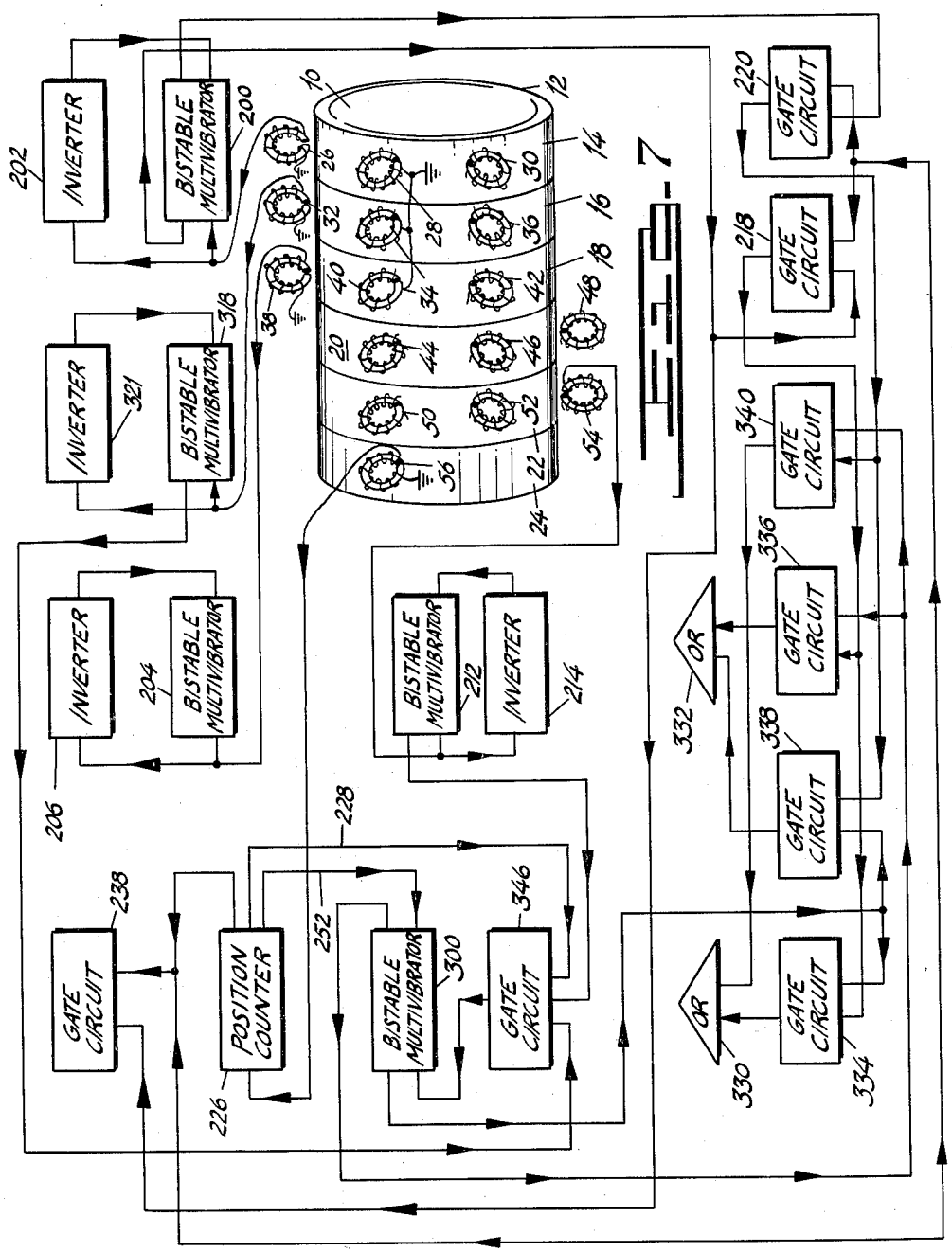

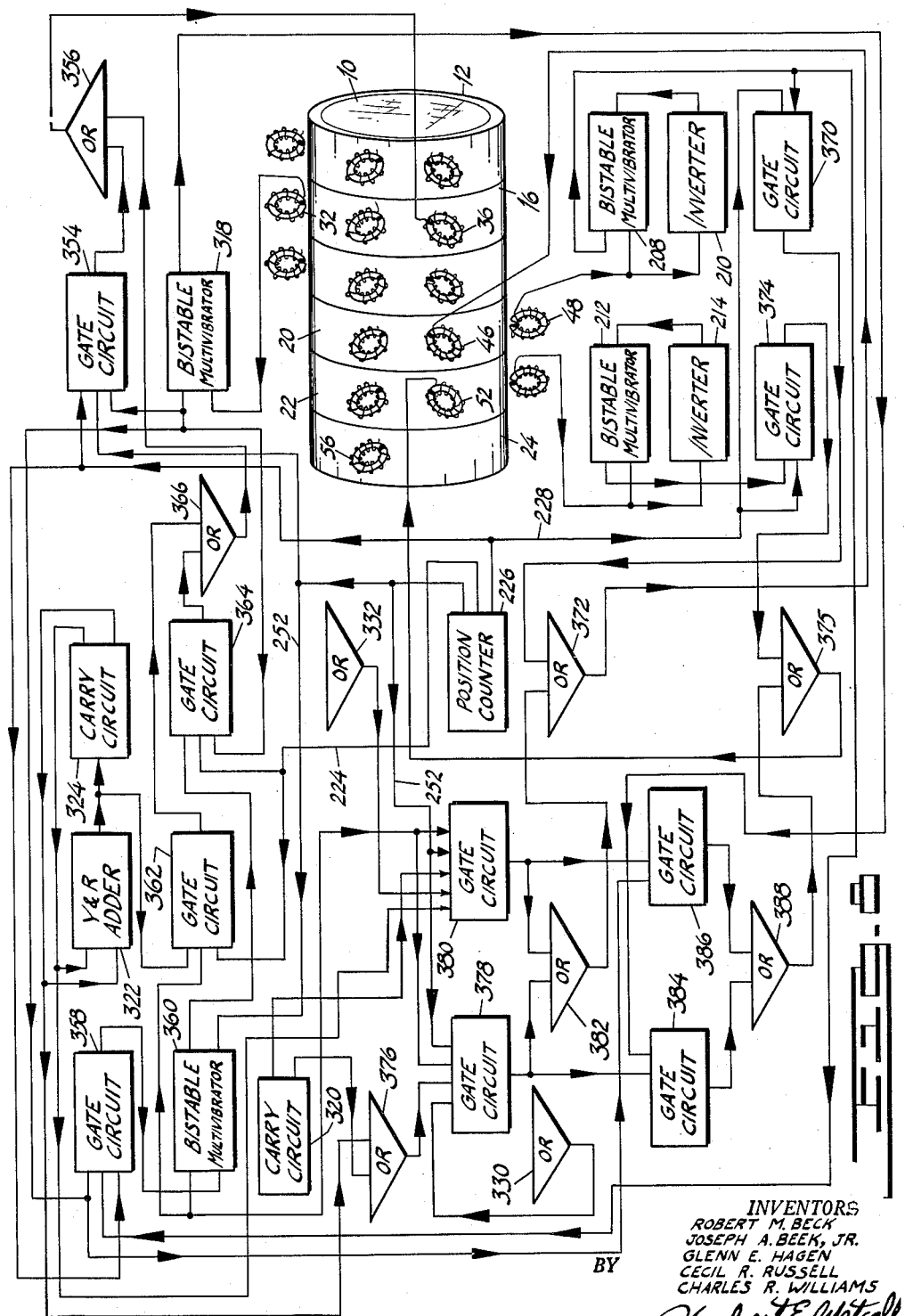

Nov. 7, 1961 G. E. HAGEN ET AL 3,007,639
DIGITAL DIFFERENTIAL ANALYZERS
Filed Nov. 6, 1953 9 Sheets-Sheet 7
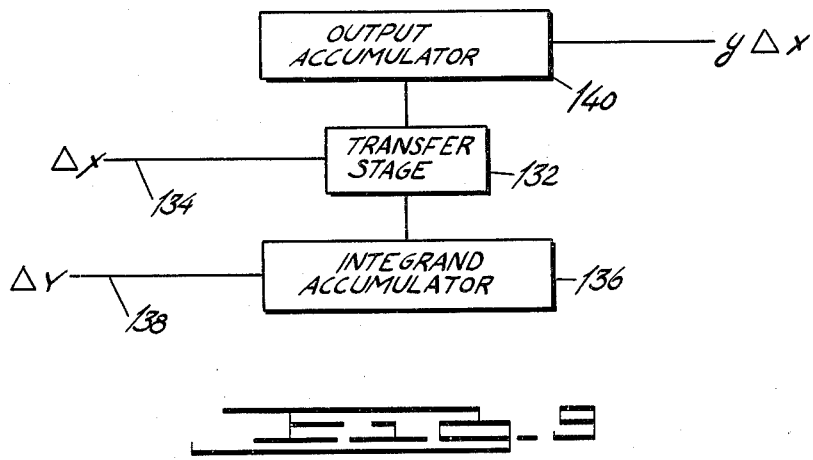
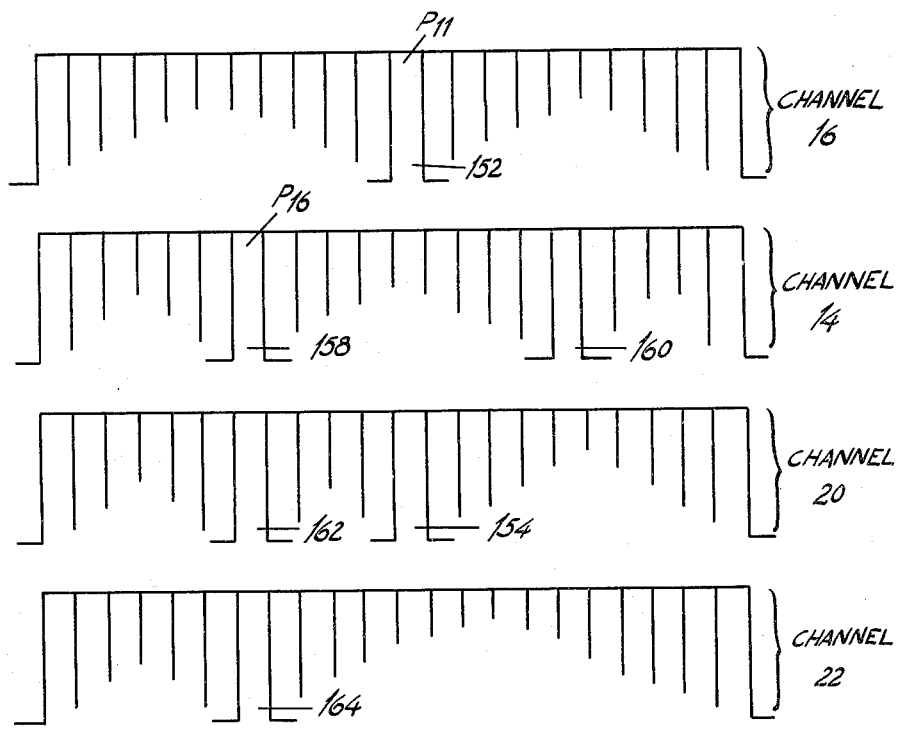
INVENTOR.
ROBERT M. BECK
JOSEPH A. BEEK, JR.
BY GLENN E. HAGEN
CECIL R. RUSSELL
CHARLES R. WILLIAMS
ATTORNEY

| CORRECTION | VOLTAGE on PLATE OF LEFT TUBE IN MULTIVIBRATOR 290 | VOLTAGE on PLATE OF LEFT TUBE IN MULTIVIBRATOR 270 |
|---|---|---|
| $-\frac{1}{2} \Sigma \Delta Y$ | HIGH | LOW |
| $+\frac{1}{2} \Sigma \Delta Y$ | LOW | LOW |
| $-\frac{1}{2} Y$ | HIGH | HIGH |
| SERVO | LOW | HIGH |

INVENTOR.
ROBERT M. BECK
JOSEPH A. BEEK, JR.
GLENN E. HAGEN
CECIL R. RUSSELL
CHARLES R. WILLIAMS

BY Herbert E. Metcalf
ATTORNEY

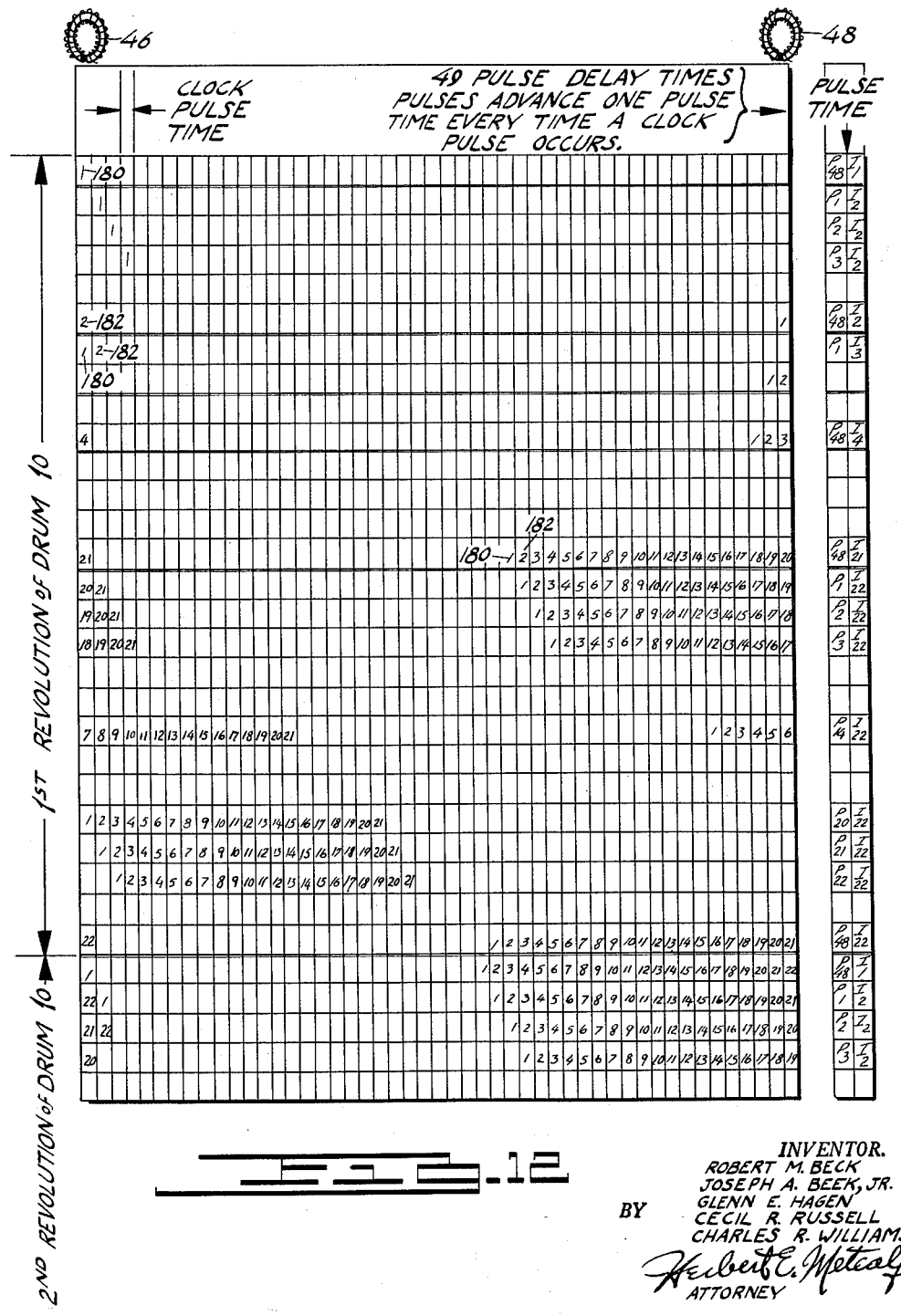

United States Patent Office 3,007,639
Patented Nov. 7, 1961

3,007,639
DIGITAL DIFFERENTIAL ANALYZERS
Glenn E. Hagen, Manhattan Beach, Charles R. Williams, Palos Verdes Estates, Joseph A. Beek, Jr., Balboa Island, Robert M. Beck, Inglewood, and Cecil R. Russell, Manhattan Beach, Calif., assignors, by mesne assignments, to The Bendix Corporation, North Hollywood, Calif., a corporation of Delaware
Filed Nov. 6, 1953, Ser. No. 390,506
16 Claims. (Cl. 235—152)

This invention relates to digital differential analyzers and more particularly to a system for enhancing the accuracy and operation of digital differential analyzers in obtaining the solution of mathematical problems.

In co-pending application Serial No. 217,478, filed March 26, 1951, now Patent No. 2,900,134, by Floyd G. Steele and Wm. F. Collison, a digital differential analyzer is disclosed for solving complex differential equations by digital steps. The analyzer operates like a differential machine in interconnecting a plurality of integrators to produce variations in the quantities in one integrator in accordance with the values of the quantities from other integrators. The analyzer operates like a digital machine in digitally varying the independent quantity in each integrator on a sequential basis and varying the other quantities in the integrator every time that the independent quantity is presented for variation. In this way, the analyzer obtains the advantages of digital computers in producing quick and accurate solutions of mathematical problems and the advantages of differential analyzers in its simplicity and compactness.

Each integrator operates to obtain the differential combination of the value of a dependent quantity for the integrator and each digital variation in the independent quantity for the integrator. However, errors result in obtaining the differential combination for each integrator. The errors result from the fact that only an approximation is made in the value of the dependent quantity for each integrator every time that the dependent quantity is differentially combined with a variation in the value of the independent quantity. The errors can often be considerably reduced by limiting the value of each digital variation in the value of the independent quantity. Even when the variations in the independent quantity are held to a relatively low value, substantial errors sometimes result in the solution of a problem. Furthermore, the time required to solve the problem sometimes becomes relatively long. Until now, attempts to minimize such errors without reducing the value of each variation in the independent quantity have not been entirely successful.

This invention provides a digital differential analyzer which minimizes any error in the differential combination for each integrator by accurately approximating the value of the dependent quantity for the integrator every time that a variation in the independent quantity occurs. The analyzer provides circuits for correcting the value of the dependent quantity for each integrator in a manner dependent upon the operation of the integrator and the connections to the integrator from other integrators in the analyzer. In this way, accurate solutions can be obtained in a relatively short space of time for a wide variety of mathematical problems.

An object of this invention is to provide a system for operating in conjunction with a digital differential analyzer to minimize the errors produced by the analyzer in solving a problem.

Another object is to provide apparatus of the above character which can be easily incorporated in a digital differential analyzer to enhance the accuracies in the solutions obtained by the analyzer.

A further object is to provide apparatus of the above character which obtains a relatively accurate approximation in the value of a dependent quantity for an integrator over the range represented by an increment in the value of an independent quantity for the integrator.

Still another object is to provide apparatus of the above character for controlling the approximation made in the value of a dependent quantity for an integrator in accordance with the function of the integrator and with the connections made to the integrator from other integrators.

A still further object is to provide apparatus of the above character which requires a minimum number of components so that only a relatively small increase is required in the size of the analyzer to obtain the benefits in accuracy.

Other objects and advantages will be apparent from a detailed description of the invention and from the appended drawings and claims.

In the drawings:

FIGURES 5, 6, 7 and 8 are schematic diagrams, partly in block form and partly in perspective, illustrating in some detail a digital differential analyzer and the components which operate in conjunction with the analyzer to form one embodiment of the invention;

FIGURE 9 is a block diagram illustrating the operation of one of the integrators forming part of the digital differential analyzer shown in FIGURES 5 to 8, inclusive;

FIGURE 10 is a chart which illustrates how different parts of an integrator such as that shown in FIGURE 9 are coded to control the operation of the integrator;

FIGURE 12 is a chart illustrating the operation of certain of the components forming a part of the analyzer shown in FIGURE 1.

Figure 1:
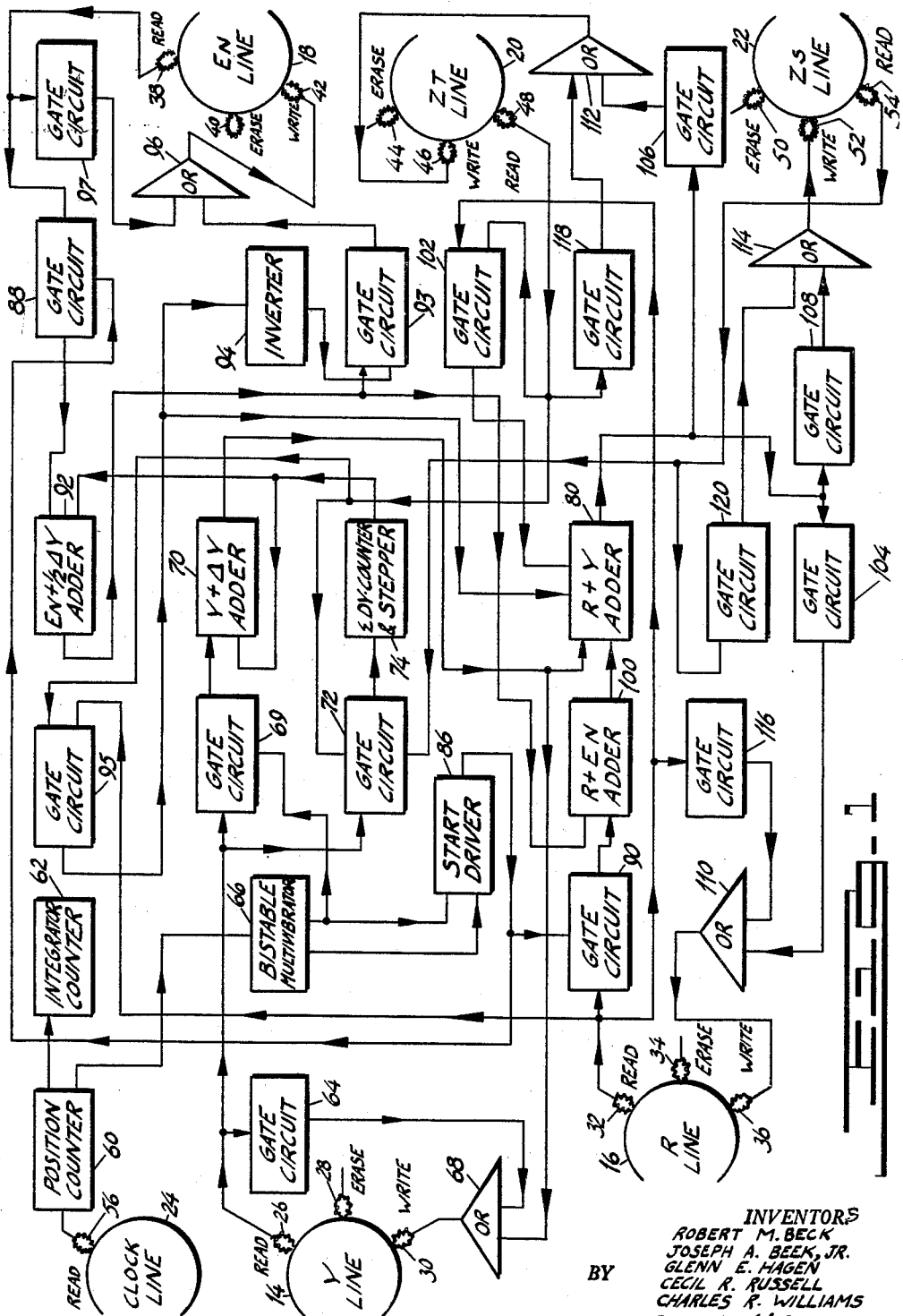
FIGURE 1 is a simplified block diagram schematically illustrating a digital differential analyzer which includes features forming one embodiment of this invention.

A simplified block diagram is shown in FIGURE 1 of an analyzer for solving differential problems by digital steps. The analyzer includes a drum 10 (schematically shown in FIGURES 5 to 8, inclusive) adapted to be rotated by a suitable motor (not shown). A thin coating 12 of magnetic material is applied to the periphery of the drum. The coating 12 can be considered as being divided into a plurality of annular channels 14, 16, 18, 20, 22 and 24. These channels are shown schematically in FIGURE 1 in separated relationship for purposes of convenience. Each of the channels is separated by a sufficient distance from its adjacent channel so as to be substantially unaffected by the magnetic information provided in the adjacent channel.

The circumferential distance of each channel may be considered as being divided into a plurality of positions. Each of the positions is sufficiently separated from its adjacent positions to receive a different magnetization than that provided on the adjacent positions. For example, approximately 1160 equally spaced pulse positions may be provided in each channel when the drum has a radius of approximately four inches.

A plurality of toroidal coils are positioned adjacent to each of the channels 14, 16, 18, 20, 22 and 24. For example, coils 26, 28 and 30 are provided in contiguous relationship to the channel 14. These coils are shown schematically in FIGURE 1. Similarly, coils 32, 34 and 36; coils 38, 40 and 42; coils 44, 46 and 48; and coils 50, 52 and 54 are associated with the channels 16, 18, 20 and 22, respectively. A single coil 56 is disposed adjacent the channel 24.

The coils 26 and 30 are effectively separated from each other by approximately 104 pulse positions and the coil 28 is disposed at an intermediate position between the coils 26 and 30. The coil 30 is adapted to provide signals in a pattern dependent on the operation of the digital differential analyzer and to induce the corresponding magnetic pattern on the drum 10, as the drum rotates. The pattern induced on the drum 10 by the coil 30 is of the binary form in which a magnetization in one circumferential direction indicates one value and a magnetization in the other direction indicates a second value.

The coil 26 is adapted to pick up the changes in the direction of magnetization in the channel 14 as the drum rotates. The coil 28 is adapted to produce a substantially constant signal for returning the direction of magnetization on the drum to that representing a value of "0" after the magnetic pattern on the drum has been converted into a corresponding electrical pattern by the coil 26.

The coils 32, 34, and 36 are separated from one another by distances corresponding to the distances between the coils 26, 28 and 30 and are adapted to perform functions similar to those performed by the coils 26, 28 and 30, respectively. The coils 38, 40 and 42 are also separated in the channel 18 in a similar manner to the coils in the channel 14 and are adapted to perform functions corresponding to those performed by the coils 26, 28 and 30, respectively.

The coils 46 and 52 are adapted to operate in a manner similar to the coil 30 to provide a magnetic pattern in the channels 20 and 22, respectively, in a pattern dependent upon the problem to be solved. The coils 46 and 52 are effectively separated from the coils 48 and 54, respectively, by approximately 49 pulse positions during the operation of the analyzer to obtain the solution of a mathematical problem.

The coils 48 and 54 are adapted to produce signals in accordance with the magnetic pattern provided in their respective channels by the coils 46 and 52. The coils 44 and 50 are adapted to operate in a manner similar to the coil 28 to produce "zero" direction of magnetization in the channels 20 and 22, respectively after the patterns provided by the coils 46 and 52 have been utilized by the coils 48 and 54, respectively.

The coil 56 is adapted to produce a cycle of a signal approximating a sine wave as each pulse position in the channel 24 moves past the coil. The coil 56 produces sinusoidal signals because of the magnetic pattern permanently provided in the channel 24. This pattern remains constant regardless of the problem to be solved.

A counter 60 is connected to the coil 56 to count the cycles of the sine waves in the channel 24 as the drum rotates. The counter 60 is formed from a plurality of multivibrators connected in cascade arrangement and is adapted to count successive sine signals in a numerical range from "1" to "48." Upon each count of "48," the counter 60 is adapted to return to its initial state for the commencement of a new count. As will be disclosed in detail hereinafter, a new integrator is presented for computation upon the completion of each count of "48."

Similarly, a counter 62 is formed from a plurality of multivibrators in cascade arrangement. The counter 62 is connected to the counter 60 to count the number of times that a full count is obtained in the counter 60. For example, the counter 62 may count up to 22 full counts in the counter 60 before returning to its initial state for the initiation of a new count. In this way, the counters 60 and 62 divide the drum 10 into 22 integrator storage sections each having 48 pulse positions and each providing the necessary storage for an integrator, which is described hereinafter with reference to FIGURE 9.

As schematically shown in FIGURE 1, the output signals induced in the coil 26 are introduced to a gate circuit 64, the operation of which is controlled by a line extending from the counter 60 (not shown for purposes of simplification). A connection is also made from the counter 60 to an input terminal in a bistable multivibrator 66. The output from the circuit 64 is introduced through an "or" network 68 to the coil 30. The output from the coil 26 is also introduced to a gate circuit 69, the operation of which is controlled by an output voltage from a second lead in the multivibrator 66. The output from the gate circuit 69 is applied to an adder 70.

In addition to being introduced to the gate circuits 64 and 69, the output from the coil 26 is introduced to a gate circuit 72. Other input terminals of the gate circuit 72 have signals applied to them from the coils 48 and 54. The output from the gate circuit 72 is applied to a counting and stepping circuit 74 which in turn has its output introduced to the adder 70. The output signals from the adder 70 are applied through the "or" network 68 to the coil 30. The output from the adder 70 is also introduced to an input terminal of an adder 80.

A driver circuit 86 is operatively controlled by the signals from the two output terminals of the multivibrator 66. The output from the driver 86 is applied to gate circuits 88 and 90 to control the operation of these circuits. When the gate circuit 88 is opened by signals from the driver 86, signals from the coil 38 pass through the gate circuit to an adder 92 for combination with the signals from the counter and stepper 74.

The output from the adder 92 is introduced to an input terminal of a gate circuit 93. Another input terminal of the gate circuit 93 is connected through an inverter 94 to a gate circuit 95 having input terminals connected to the coils 32 and 48. The output from the gate circuit 93 is applied through an "or" network 96 to the coil 42. The "or" network 96 also passes to the coil 42 signals which pass through a gate circuit 97 from the coil 38.

When the gate circuit 90 opens upon the introduction of a signal from the driver 86, signals pass through the gate circuit from the coil 32. These signals are introduced to an adder 100 for combination with the output signals from the adder 92. The output signals from the adder 100 are in turn introduced to the adder 80 for combination with the numerical information passing through the adder 70. The operation of the adder 80 is controlled by the output signals from the gate circuit 95.

The output signals from the adder 80 are introduced to gate circuits 104, 106, and 108. The gate circuits 104, 106, and 108 are respectively connected to "or" networks 110, 112, and 114 for introduction to the coils 36, 46, and 52 of the signals passing through the networks. The "or" networks 110, 112, and 114 also pass to the coils 36, 46, and 52, respectively, signals passing through gate circuits 116, 118, and 120 from the coils 32, 48, and 54, respectively.

The digital differential analyzer disclosed above is adapted to provide the solution of differential equations. For example, it may provide the solution of the problem of evaluating the integral of a general equation $y=f(x)$ so as to obtain a function $\int y dx = \int f(x) dx$, where $f(x)$ represents a function of $x$ and $\int f(x) dx$ represents the integral of the function. If a curve $y=f(x)$ is plotted with $x$ as the abscissa and $y$ as the ordinate, the analyzer obtains the relationship $\int y dx = \int f(x) dx$ by computing the area under the curve $y=f(x)$. By determining the area under the curve $y=f(x)$, the analyzer performs electronically operations that may sometimes be performed mentally by a skilled mathematician when the problem to be solved is relatively simple.

Figure 2:
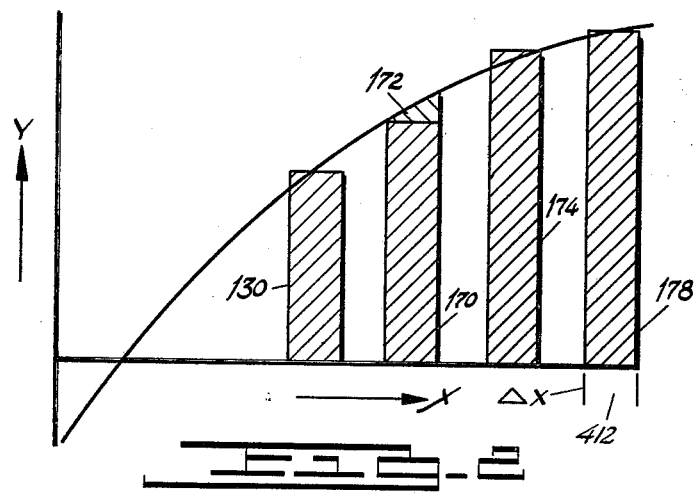
FIGURES 2, 3 and 4 are curves which illustrate the corrections made to different integrators in accordance with the functions of the integrators and the connections from other integrators.

The analyzer obtains the value of the function $\int y dx = \int f(x) dx$ by producing small increments of $x$. These increments may be represented by the symbol $\Delta x$. For each $\Delta x$ increment, the analyzer determines the value of $y$ and obtains the product $y\Delta x$. This product $y\Delta x$ approximates the area under the curve $y=f(x)$ for each $\Delta x$ increment, as indicated in FIGURE 2 by the shaded area 130 for a particular $\Delta x$ increment. If the product $y\Delta x$ is obtained for successive $\Delta x$ increments and if all of the $y\Delta x$ increments are added together, the area under the interval of the curve representing $f(x)$ from $x_0$ to $x$ may be approximated. A relatively accurate approximation may be obtained by decreasing the value of each $\Delta x$ increment.

An integrator for determining the $y\Delta x$ increments and for storing the cumulative values of these increments is shown in FIGURE 9. The integrator includes a transfer stage 132 for obtaining $\Delta x$ increments at periodic intervals through a line 134. The integrator also has an integrand accumulator 136 for storing the value of the dependent quantity $y$ and for receiving $\Delta y$ increments through a line 138 from its own and from other integrators so as to vary the value of $y$ in accordance with the function $y=f(x)$. An output accumulator 140 is provided to receive $y\Delta x$ increments, to combine each $y\Delta x$ increment with the previous increments and to deliver the cumulative value obtained to another integral accumulator or transfer stage while holding the remainder in store. A detailed explanation of this will be given hereafter.

Figures 11, 13:
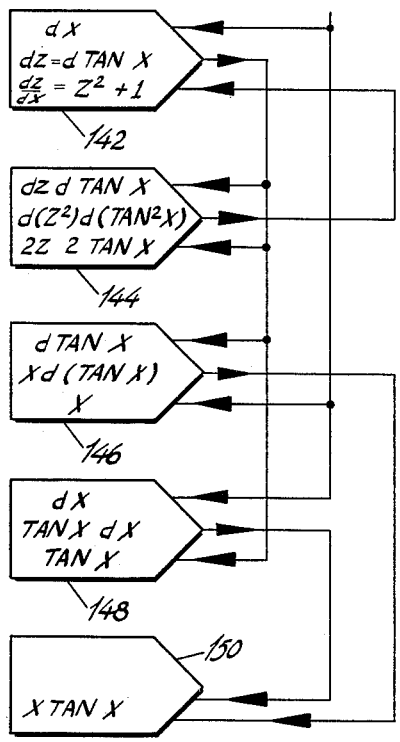
FIGURE 11 is a schematic diagram illustrating the relationship between different integrators forming the digital differential analyzer shown in FIGURES 5 to 8, inclusive when the analyzer is solving a particular problem.
FIGURE 13 is a chart which illustrates the operation of certain of the components shown in FIGURE 6.

The interrelationship between different integrators is illustrated in FIGURE 11 for a particular problem. This problem starts with a differential equation represented by $$\frac{d^2y}{dx^2}=y^2+1$$

As is methematically known, the differential solution of this problem indicates that $y=\tan x$. The integrators involved in the solution of this problem are indicated in FIGURE 11 by blocks 142 and 144. Integrators represented by blocks 146, 148 and 150 then utilize the function $y=\tan x$ to generate an output function $y=x \tan x$. This output function is indicated in the block 150.

In each integrator, the introduction of the $\Delta x$ increments constituting changes in the independent variable quantity for the integrator is indicated by a line extending into the upper right portion in the block. The $\Delta y$ increments are introduced into the integrator through a line or a plurality of lines extending into the lower right portion of the block representing the integrator. The output of the integrator is obtained from a line extending from an intermediate position at the right side of the appropriate block.

As will be seen in FIGURE 11, $\Delta x$ increments of the independent variable for a particular integrator may be obtained from the output of another integrator. For example, in FIGURE 11, the $\Delta x$ increments for the integrators 144 and 146 are obtained from the output of the integrator 142. Similarly, $\Delta y$ increments for a particular integrator may be obtained from the output of other integrators as well as from the output of the integrator itself. For example, $\Delta y$ increments for the integrators 144 and 148 are obtained from the output of the integrator 142.

The $\Delta x$ and $\Delta y$ increments for each integrator are actually determined from a coded pattern provided in the channels 16 and 14, respectively. As previously disclosed, the pulse positions in each channel are subdivided into 22 integrator storage sections each having 48 pulse positions. The first 22 positions in each integrator storage section in the channel 16 are coded to indicate a $\Delta x$ increment. Since the first 22 positions in the channel 16 for each integrator correspond in number to the 22 integrators in the analyzer, each integrator can receive a $\Delta x$ increment from the output of any of the other integrators. This can be effectuated by providing a pulse in the channel 16 in a particular one of the first 22 positions for the integrator.

For example, the $\Delta x$ increments for the integrator 144 in FIGURE 11 would be coded in a particular one of the 22 positions in the channel 16. As will be disclosed in detail hereinafter, the particular position corresponds to the time at which the output from the integrator 142 appears on the coils 48 and 54. In FIGURE 10, a pulse 152 is shown as being recorded in the channel 16 in the 11th pulse position for a particular integrator.

A pulse in the channel 16 in one of the first 22 positions for a particular integrator indicates that a $\Delta x$ increment may be made for the integrator. However, such a pulse does not indicate whether an increment will actually be made and, if so, whether the polarity of such increment will be positive or negative. The actual occurrence of a $\Delta x$ increment for the integrator is indicated by the presence or absence of a coincidental pulse in the channel 20. If a positive pulse is picked up from the channel 20 by the coil 48 at the same time as the pulse representing a possible $\Delta x$ increment for a particular integrator is picked up by the coil 32, a $\Delta x$ increment for the integrator actually occurs. For example, the pulse 152 in FIGURE 10 indicates an actual $\Delta x$ increment for a particular integrator since it coincides in time with a pulse 154 in the channel 20. A $\Delta x$ increment is not obtained for the integrator if a pulse does not appear in the channel 20 at the same time as the pulse in the channel 16.

The polarity of each $\Delta x$ increment is determined by the presence or absence of a coincidental pulse in the channel 22. If a pulse is picked up from the channel 22 by the coil 54 at the same time that pulses indicating an actual $\Delta x$ increment for a particular integrator are picked up by the coils 32 and 48, the $\Delta x$ increment for the integrator is positive. The $\Delta x$ increment is negative if a pulse does not appear in the channel 22 at the same time as the pulses in the channels 16 and 20. For example, the pulse 152 in FIGURE 10 indicates a negative $\Delta x$ increment since a pulse does not appear in the channel 22 simultaneously with the occurrence of the pulses 152 and 154 in the channels 16 and 20, respectively.

The first 22 positions in the channel 14 for each integrator are coded to indicate $\Delta y$ increments in a manner similar to the coding of corresponding positions in the channel 16 to indicate $\Delta x$ increments. Since the first 22 positions in each integrator correspond to the 22 integrators in the digital differential analyzer, each integrator is coded in particular ones of the first 22 positions in the channel 14 so as to receive the outputs from certain other integrators in accordance with the problem to be solved. For example, a pulse would be coded in the channel 14 in a particular one of the first 22 positions for the integrator 148 in FIGURE 11 so as to coincide with the time at which the output from the integrator 142 is made available to the coils 48 and 54 in the channels 20 and 22, respectively. Although only one $\Delta x$ increment can be obtained for an integrator upon each revolution of the drum, several $\Delta y$ increments can be obtained. This may be seen by the pulses 158 and 160 in the channel 14 in FIGURE 10.

Each pulse in the first 22 positions in the channel 14 for each integrator represents the possibility of a $\Delta y$ increment but does not indicate the actual occurrence of such an increment or the polarity of the increment. The actual occurrence of the increment is indicated by the presence or absence of a pulse in the channel 20 at the same time that the pulse in the channel 14 is made available to the coil 26. For example, the pulse 158 in FIGURE 10 indicates an actual $\Delta y$ increment for a particular integrator since it coincides in time with a pulse 162 in the channel 20. However, no $\Delta y$ increment is obtained when the pulse 160 is picked up by the coil 26 since there is no coincidental pulse in the channel 20.

The sign of each actual $\Delta y$ increment is indicated by the presence or absence of a pulse in the channel 22 at the time that pulses in the channels 14 and 20 are simultaneously made available to the coils 26 and 48. For example, the pulse 158 in FIGURE 10 indicates a positive Δy increment for a particular integrator since a pulse 164 appears in the channel 22 at the time that the pulses 158 and 162 are picked up by the coils 26 and 48, respectively.

Since the interrelationship between the different integrators remains constant during the solution of a particular problem, the coding pulses in the channels 14 and 16 for the first 22 positions of each integrator must be retained during the computation. Retention of the pulses in the channel 14 is effectuated by the gate circuit 64, which opens during the first 22 pulse positions in each integrator to pass the coded information in these positions. The gate circuit 64 opens during these pulse positions because of the introduction of a relatively high voltage from the counter 60 through a suitable connection (not shown for purposes of simplification). The signals then pass through the "or" network 68 for recordation in the channel 14 by the coil 30. Similarly, the gate circuit 116 opens during the first 22 positions for each integrator so that the coding information can pass through the "or" network 110 for recordation by the coil 36 in the channel 16.

It should be appreciated that the gate circuits similar to the circuit 64 operate to pass information only when positive voltages are simultaneously introduced to all of the input terminals of the circuit. In computer terminology, such circuits have been designated as "and" networks. The term "or" network is also common in computer terminology. Such circuits operate to pass information when any one of the input terminals receives a relatively high voltage.

During the first 22 positions of each integrator, the gate circuit 72 operates to determine the occurrence of Δy increments for the integrator and the polarity of each such increment. The gate circuit 72 makes such determinations by comparing the pulses from the coil 26 with the pulses from the coils 48 and 54. Each pulse induced in the coil 26 in the first 22 positions for an integrator indicates that a Δy increment can be obtained. As previously disclosed, the particular position in which a pulse occurs determines for an integrator which of the other integrators in the analyzer provides Δy increments for the integrator. The simultaneous production of a pulse by the coil 48 indicates that a Δy increment has actually occurred. When the coil 54 also produces a simultaneous pulse, the gate circuit 72 indicates that the Δy increment has a positive polarity.

At the same time that the gate circuit 72 operates to determine the occurrence of Δy increments for an integrator and the polarity of each such increment, the circuit 74 arithmetically combines each such Δy increment. For example, a signal passing to the circuit 74 from the gate circuit 72 may cause the circuit 74 to provide a numerical indication of +4 when an indication of +3 was previously provided by the circuit. Similarly, the indications in the circuit 74 may change from a value of −3 to a value of −4 upon the introduction of a negative signal from the gate circuit 72.

The circuit 74 retains in binary form the numerical information relating to the cumulative value of the Δy increments for an integrator. The circuit 74 retains the information in binary form since it comprises a plurality of multivibrators arranged in cascade relationship. For example, with a resultant count of +5 for the Δy increments for a particular integrator, the first and third multivibrators in the cascade arrangement may be operated to indicate a binary pattern of 101, where the least significant digit is at the right. In binary form, a pattern of 101 indicates that $(1)(2^2)+(0)(2^1)+(1)(2^0)=5$. Similarly, a value of +3 is indicated by a pattern of 011, where the least significant digit is at the right.

The output from the circuit 74 is introduced to the adder 70 for combination with the numerical information in the channel 14. The numerical information in the channel 14 occurs after the 22nd pulse position for each integrator. This information is arithmetically combined on a sequential basis for each pulse information with the cumulative value of the Δy increments. The arithmetical combination of the information in the channel 14 and the circuit 74 occurs for each integrator every time that the integrator is presented for computation. The computation occurs only after the gate circuit 69 has been opened by a relatively high voltage from the multivibrator 66 so that the signals produced by the coil 26 can pass to the adder 70.

The information obtained for each pulse position by the adder 70 represents the new value of the dependent quantity y for each integrator. This information passes through the "or" network 68 for recordation by the coil 30 in the channel 14. The new information for each computation is thereafter combined with new increments of Δy when the integrator is again presented for computation. In this way, the value of y is subject to continuous variation.

As previously disclosed, the value of the dependent quantity y for an integrator is differentially combined with increments in the independent quantity x for the integrator when the integrator is presented for computation. In co-pending application Serial No. 217,478, filed March 26, 1951 by Steele and Collison, a differential combination is obtained similar to that shown in shaded lines at 170 in FIGURE 2. The differential combination is obtained by combining an increment in the independent quantity x with the value of y at the beginning of the increment. Because of the use of the particular value of the dependent quantity y, an error is obtained in each differential combination. This error is shown at 172 in FIGURE 2.

The error in obtaining $\int y dx = \int f(x) dx$ can be minimized by making each Δx increment relatively small. In many instances, it also becomes relatively small because of the tendency for different yΔx increments to compensate for one another. This may be seen from the fact that the yΔx increments are lower than their correct value while y is increasing, and they are above their true value while y is decreasing in value. Because of this, some compensation occurs for a curve $y=f(x)$, where y increases and decreases for different intervals along the length of the curve.

Instead of using the value of the dependent quantity y at the beginning of each Δx increment, the value of y at the end of each Δx increment may be used. This system is utilized in the analyzer disclosed in co-pending application Serial No. 263,152, filed December 26, 1951, now Patent No. 2,850,232, by Glenn E. Hagen et al. The differential combination obtained by using such a value of y is indicated at 174 for a particular Δx increment. As may be seen, an error in the differential combination is also produced when the value of y at the end of each Δx increment is utilized. As disclosed above, any errors can be minimized by reducing the value of each Δx increment. Compensation can also be provided for errors in different yΔx increments when y is increasing at times and decreasing at other times.

In this invention, a second order approximation is obtained for the value of the dependent quantity y over the portion of a curve $y=f(x)$ represented by each Δx increment. The approximation is obtained by taking a value of y intermediate between the value of y at the beginning of each Δx increment and the value of y at the end of the increment. When such an approximation is made, a differential combination similar to that shown at 178 is obtained. This differential combination involves errors which are often considerably less than those produced by the differential combinations disclosed in previous applications.

The correction to the value of y for each differential combination is obtained for each integrator by dividing in two the cumulative value of the Δy increments for the integrator every time that the integrator is presented for computation. This is accomplished by making the indications in the circuit 74 available one pulse position earlier than they are made for utilization in the adder 70. For example, an indication that would be introduced from the circuit 74 to the adder 70 in pulse position 25 of an integrator is applied to the adder 92 in pulse position 24 for the integrator. This causes a binary indication of a value such as +6 to appear as an indication of +3 when it is advanced one position in the direction of decreasing significance.

Sometimes a $\Delta x$ increment does not occur for an integrator when the integrator is presented for computation. When a $\Delta x$ increment does not occur for the integrator, the corrective factor in the value of $y$ is accumulated until the next $\Delta x$ increment occurs for the integrator. In this way, the values of $\frac{1}{2}\Delta y$ may be accumulated for an integrator over several computational cycles so that a value of $\frac{1}{2}\Sigma\Delta y$ is obtained. When a $\Delta x$ increment actually occurs, the value of $\frac{1}{2}\Sigma\Delta y$ is subtracted from the value of $y$ at the end of the increment to obtain an intermediate value of $y$ over the range of the $\Delta x$ increment. Upon the occurrence of a $\Delta x$ increment, the cumulative value represented by $\frac{1}{2}\Sigma\Delta y$ is eliminated so that a new value can be obtained for correcting the value of $y$ over the next $\Delta x$ increment.

The channel 18 provides binary information for indicating the value of $\frac{1}{2}\Sigma\Delta y$ for each integrator. Such information is provided after the 22nd pulse position for each integrator. The information is made available by the coil 38 to the gate circuit 88 which opens after the 22nd pulse position for each integrator to pass the information to the adder 92. The adder 92 also receives $\frac{1}{2}$ of the cumulative value of the $\Delta y$ increments for an integrator every time that the integrator is presented for computation. The adder then arithmetically combines the information in the channel 18 and the information from the circuit 74 to obtain new indications representing $\frac{1}{2}\Sigma\Delta y$. The new indications obtained by the adder pass through the gate circuit 93 and the "or" network 96 for recordation by the coil 42 in the channel 18 when a $\Delta x$ increment has not actually occurred.

The occurrence of a $\Delta x$ increment for each integrator is determined by the gate circuit 95, which compares the coding pulses from the coil 32 with the pulses from the coil 48. Upon the simultaneous occurrence of pulses from the coils 32 and 48 during one of the first 22 positions for an integrator, a $\Delta x$ increment actually occurs. Such an increment is indicated by a pulse from the gate circuit 95. This pulse is introduced to the inverter 94, which inverts the amplitude of the pulse from a high value to a low value. The inverted pulse is then introduced to the gate circuit 93 to prevent the gate circuit from operating. When a $\Delta x$ increment does not occur, however, so that a pulse is not produced by the gate circuit 95, a relatively low voltage is produced by the gate circuit. This voltage is inverted by the inverter 94 and is introduced to the gate circuit 93 to open the gate circuit. This causes the information from the adder 92 to pass through the gate circuit 93 and the "or" network 96 to the coil 42.

The indications obtained by the adder 92 are also introduced to the adder 100 for combination with the signals provided by the coil 32. As previously disclosed, the indications provided by the coil 32 after the 22nd pulse position for each integrator represent the cumulative value of the $y\Delta x$ increment for the integrator. Only the indications after the 22nd pulse position for each integrator pass to the adder 100 because of the operation of the gate circuit 90. The numerical information from the coil 32 and the adder 92 are arithmetically combined by the adder 100 to obtain numerical information designated for future reference as $R_s$.

As previously disclosed, the value of $\frac{1}{2}\Sigma\Delta y$ is obtained for certain integrators to provide a corrective factor in the value of $y$ for the integrators. The value of $\frac{1}{2}\Sigma\Delta y$ for each integrator may of course be directly combined with the dependent quantity $y$ for the integrator to obtain the proper correction in the value of $y$ over the range of values occurring in each $\Delta x$ increment. It may also be combined with the cumulative value of the $y\Delta x$ increments for the integrator, since the cumulative value of the $y\Delta x$ increments is thereafter combined with the value of $y$ for the integrator. It is the adder 100 which arithmetically combines the value of $\frac{1}{2}\Sigma\Delta y$ for each integrator to obtain the value of $R_s$.

The adder 80 in turn operates to combine the value of $R_s$ for each integrator with the value of the dependent quantity $y$ provided by the adder 70 for the integrator. The information obtained by the adder 80 represents the new cumulative value of the $y\Delta x$ increments for each integrator. It is obtained only when a $\Delta x$ increment has actually occurred for an integrator since the operation of the adder 80 is controlled by the introduction of a signal from the gate circuit 95.

The information provided by the adder 80 passes through the gate circuit 104, which opens after the 22nd pulse position for each integrator. The information then passes through the "or" network 110 for recordation by the coil 36 in the channel 16. When the integrator is again presented for computation, the information recorded by the coil 36 appears adjacent the coil 32 to produce a corresponding pattern in the coil. In this way, the information is made available to the adders 100 and 80 to obtain a new value of the cumulative $y\Delta x$ increments for the integrator.

Since the cumulative value of $y\Delta x$ increments for each integrator can be stored in only the pulse positions after the 22nd pulse position for the integrator in the channel 16, these indications occasionally overflow. When an overflow occurs for an integrator, the indications for the integrator in the channel 16 represent an intermediate value so that they can build up again to a relatively high value. At the same time, an overflow pulse is produced by the adder 80 in the last pulse position for the integrator. This pulse passes through the gate circuit 106, which opens at the last pulse position for each integrator. The pulse then passes through the "or" network 112 for recordation by the coil 46 in the channel 20.

For example, a first pulse of relatively high voltage may be provided in the channel 20 at the 48th position of integrator "1." This pulse indicates that an overflow has occurred in the cumulative $y\Delta x$ value stored in the channel 16 for the integrator but the pulse does not indicate whether the overflow is positive or negative. The pulse is indicated at 180 in the chart shown at FIGURE 12.

In all of the vertical columns in the chart shown in FIGURE 12, except for the two at the extreme right, numbers between "1" and "22" are shown corresponding to the 22 integrators in the digital differential analyzer. In th two columns at the extreme right, numbers are shown prefaced by the letters "I" and "P." The letter "I" followed by a number indicates the particular integrator that is moving past the coil 46 at any instant. For example, "I$_3$" indicates that a pulse position in the third integrator is moving past the coil 46 in the channel 20. Similarly, a designation such as P$_{13}$ indicates that the 13th pulse position in the particular integrator is moving past the coil 46.

After the pulse 180 is recorded by the coil 46 in the channel 20, it advances from the coil 46 towards the coil 48. During this time, the first 47 positions of integrator "2" are passing under the coil 46. At the P$_{48}$I$_2$ position— or, in other words, the last position of integrator "2"—an indication is recorded by the coil 46 in the channel 20, as indicated at 182 in FIGURE 12. At the P$_1$I$_3$ position, the indication 180 passes through the gate circuit 118 and the "or" network 112 to the coil 46. The pulse passes through the gate circuit 118 since the gate circuit opens in the first 47 pulse positions of each integrator.

After passing through the gate circuit 118 in the "or" network 112, the pulse 180 is again recorded by the coil 46 in the channel 20, this time at the pulse position adjacent to the indication 182.

Similarly, indications are provided in adjacent pulse positions to show whether or not an overflow has occurred in the cumulative $y\Delta x$ value for each of the other integrators in the analyzer. These indications are recirculated by the gate circuit 118, which remains open during the first 47 pulse positions of each integrator. At the 48th position for each integrator, the gate circuit 118 closes and prevents any recirculation of old information for the integrator.

At the same time that the gate circuit 118 closes, the gate circuit 106 opens. When the gate circuit 106 opens, the overflow information for the integrator moving past the coil 46 is recorded in the channel 20. In this way, old overflow information for an integrator is replaced by new overflow information for the integrator every time that the integrator is presented for computation.

After the indications have been provided in the channel 20 for the 48th pulse position of each integrator, integrator "1" is presented for computation a second time. As the drum rotates through the first 22 positions for the integrator, the output indications for the 22 integrators move in sequence past the coil 48. This causes the output indications in the channel 20 to become available for determining whether or not a $\Delta x$ increment and $\Delta y$ increments are actually obtained for the integrator during the second computation. The determination of the occurrence of an actual $\Delta x$ increment and of actual $\Delta y$ increments is made by respectively comparing the coding pulses in the channels 14 and 16 with the coding pulses in the channel 20. The operation of the digital differential analyzer to obtain such a determination has been disclosed previously.

In like manner, overflow indications are recorded in the channel 22 to indicate the polarity of each $\Delta x$ increment and each $\Delta y$ increment. The overflow indications are positive when pulses are actually recorded in the channel 22 and are negative when pulses are not recorded in the channel 22. As each integrator is presented for computation, the overflow indications in the channel 22 are made available to the integrator in a manner similar to the pulses in the channel 20.

The system disclosed above is shown in some detail in FIGURES 5 to 8, inclusive. The system includes the channels 14, 16, 18, 20, 22 and 24 and the coils respectively associated with the different channels. For example, the coils 26, 28 and 30 are associated with the channel 14. The coil 26 is connected to the grid of the left tube in a bistable multivibrator 200 (FIGURE 5) and to the input terminal of an inverter 202, the output from which is introduced to the grid of the right tube in the multivibrator 200. A multivibrator 204 and an inverter 206; a multivibrator 208 and an inverter 210; and a multivibrator 212 and an inverter 214 are respectively associated with the coils 38, 48 and 54 in a manner similar to that in which the multivibrator 200 and the inverter 202 are associated with the coil 26.

Connections are made from the plate of the left tube in the multivibrator 200 to input terminals of gate circuits 218 (FIGURE 5) and 220 and from the plate of the right tube in the multivibrator 200 to an input terminal of a gate circuit 222. The gate circuits 218 and 222 have other input terminals connected through a line 224 to a counter 226, corresponding to the counter 60 shown in FIGURE 1. Voltage is also introduced from the counter 226 through a line 228 to an input terminal of the gate circuit 220.

Signals passing through the gate circuits 218 and 222 are introduced to an adder 230 corresponding to the adder 70 in FIGURE 1. The signals from the gate circuit 218 are also introduced to the grid of the left tube in a bistable multivibrator 232 corresponding to the multivibrator 66 shown in FIGURE 1. A connection is made from the output terminal of the gate circuit 220 to the input terminal of an "or" network 236 having its output terminal connected to the coil 30.

In addition to being connected to the gate circuits 218 and 220, the plate of the left tube in the multivibrator 200 is connected to an input terminal of a gate circuit 238. Other input terminals of the gate circuit 238 are connected to the plate of the left tube in the multivibrator 208 and through the line 228 to the counter 226. The output from the gate circuit 238 is introduced to input terminals of gate circuits 242 and 244, other input terminals of which are respectively connected to the plates of the left and right tubes in the multivibrator 212.

The signals passing through the gate circuits 242 and 244 are introduced to a counter 246 having its output terminals connected to a stepping circuit 248. The counter 246 and stepping circuit 248 operate in a manner similar to that disclosed above for the circuit 74 shown in FIGURE 1. The counter 246 and stepping circuit 248 can be considered as a single stage controlled by a plurality of logical networks. Actually, the counter 246 and stepping circuit 248 are shown as a single unit in FIGURE 29 and described on pages 90 to 97, inclusive, of the specification as a single unit in co-pending application Serial No. 217,478. Output terminals of the stepping circuit 248 are connected to the grids of the left and right tubes in a multivibrator 250, the plates of the left and right tubes in the multivibrator 250 being connected to input terminals of the adder 230.

The operation of the adder 230 is controlled by a signal from the plate of the left tube in the multivibrator 232. As will be disclosed in detail hereinafter the operation of the adder 230 is terminated at the last pulse position of each integrator because of a connection from the counter 226 through a line 252 to the grid of the right tube in the multivibrator 232. The output signals produced by the ladder 230 are introduced to a carry circuit 254 having its output terminals connected to input terminals of the adder 230. The output from the adder 230 is also introduced through the "or" network 236 to the coil 30 for recordation by the coil in the channel 14.

The output terminals from the stepping circuit 248 are not only connected to the multivibrator 250 but also to input terminals of an adder 258 corresponding to the adder 92 in FIGURE 1. Connections are made to other input terminals of the adder 258 from the plates of the left and right tubes in the multivibrator 204 and from a carry circuit 260 which receives its information from the adder 258.

The operation of the stepping circuit 248 and the adder 258 is controlled by signals from a driver circuit 262 having its input terminal connected to the output terminal of an "or" network 264. The driver 262 is adapted to produce signals of the same polarity as the polarity of the signals introduced to it from the "or" network 264. This may be accomplished by a cascade arrangement of two stages each of which inverts the output from the previous stage. The "or" network 264 in turn receives signals from the plate of the left tube in the multivibrator 232 and from a gate circuit 266. Connections are made to input terminals of the gate circuit 266 from the plate of the right tube in the multivibrator 232, from the plate of the left tube in the multivibrator 200 and through the line 224 from the counter 226.

The output from the adder 258 is introduced to a gate circuit 268 having other input terminals connected to the plates of the right tubes in multivibrators 270 and 360 and through a line 273 to the counter 226. The signals passing through the gate circuit 268 are applied through an "or" network 274 to the coil 42 for recordation by the coil in the channel 18. The coil 42 also receives signals passing through the "or" network 274 from a gate circuit 276. Input terminals of the gate circuit 276 are connected to the plate of the left tube in the multivibrator 204 and through the line 228 to the counter 226.

In addition to being connected to the gate circuit 276, the plate of the left tube in the multivibrator 204 is connected to gate circuits 282 and 284 (FIGURE 6). Other input terminals of the gate circuits 282 and 284 receive voltages through lines 286 and 288, respectively, from the counter 226. The output terminals from the gate circuits 282 and 284 are respectively connected to the grids of the left tubes in a multivibrator 290 and the multivibrator 270. The grids of the right tubes in the multivibrators 270 and 290 are connected through the line 252 to the counter 226.

The plates of the right tubes in the multivibrators 270 and 290 are connected to input terminals of a gate circuit 294 having another input terminal connected to the driver circuit 262. The output from the gate circuit 294 is in turn applied to gate circuits 296, 297, 298 and 299 having other input terminals connected to the output terminals of the adder 258. The gate circuits 296 and 299 also have input terminals connected to the plate of the left tube in a bistable multivibrator 300, and the gate circuits 297 and 298 have input terminals connected to the plate of the right tube in the multivibrator 300. The multivibrator 300 will be disclosed in detail hereinafter.

The plate of the left tube in the multivibrator 290 is connected to an input terminal of a gate circuit 306 (FIGURE 6) another input terminal of which is connected to the driver 262. The output from the gate circuit 306 is applied to gate circuits 307, 308, 309 and 310 having other input terminals connected to the output terminals of the adder 258. Signals are also applied to input terminals of the gate circuits 307 and 310 from the plate of the left tube in the bistable multivibrator 300 and to input terminals of the gate circuits 308 and 309 from the plate of the right tube in the multivibrator 300. Connections are respectively made from the gate circuits 308 and 310 to and "or" network 312 and from the gate circuits 307 and 309 to an "or" network 314. Other input terminals of the "or" networks 312 and 314 receive voltages from the gate circuits 297 and 298 and the gate circuits 296 and 299, respectively.

Voltages are applied to an adder 319 from the plates of the left and right tubes in a multivibrator 318.

The adder 319 also receives voltages from a carry circuit 320, the operation of which is in turn controlled by the output from the adder 319. As shown in FIGURE 7, the grid of the left tube in the multivibrator 318 is connected to the coil 32 in the channel 16, and the grid of the right multivibrator tube is connected to an inverter 321 having an input terminal connected to the coil 32.

The output from the adder 319 is introduced to an adder 322, which also receives signals from a carry circuit 324 and from gate circuits 326 and 328. Each of the gate circuits 326 and 328 has an input terminal connected to the plate of the left tube in the multivibrator 232. Connections are also made to an input terminal of the gate circuits 326 and 328 from the output terminals of the "or" networks 330 and 332, respectively.

The "or" network 330 receives voltages from gate circuits 334 (FIGURE 7) and 340, and the "or" network 332 has voltages applied to it from gate circuits 336 and 338. Input terminals of the gate circuits 334 and 338 are connected to the plate of the left tube in the multivibrator 300 and input terminals of the gate circuits 336 and 340 are connected to the plate of the right tube in the multivibrator 300. Connections are made to other terminals of the gate circuits 334 and 336 from the gate circuit 218 (also shown in FIGURE 5) and to other input terminals of the gate circuits 338 and 340 from the gate circuit 220.

The grid of the right tube in the multivibrator 300 is connected through the line 252 to the counter 226. The grid of the left tube in the multivibrator 300 receives its voltage from a gate circuit 346 having input terminals connected to the plates of the left tube in the multivibrators 212 and 318 and through the line 228 to the counter 226.

The plate of the left tube in the multivibrator 318 is also connected to a gate circuit 354 in FIGURE 8, the operation of which is controlled by voltages introduced to the gate circuit through the lines 228 and 252 from the counter 226. The output from the gate circuit 354 passes through an "or" network 356 for recordation by the coil 36 in the channel 16.

The voltage on the plate of the left tube in the multivibrator 318 is also introduced to an input terminal of a gate circuit 358 (FIGURE 8) having other input terminals connected to the plate of the left tube in the multivibrator 208 and through the line 228 to the counter 226. The signals passing through the gate circuit 358 are applied to the grid of the left tube in a bistable multivibrator 360, the grid of the right tube in the multivibrator 360 being connected through the line 252 to the counter 226.

The plate of the left tube in the multivibrator 360 is connected to an input terminal of a gate circuit 362, other input terminals of which receive voltages from the adder 322 and through the line 224 from the counter 226. The voltage on the plate of the right tube in the multivibrator 360 is applied to an input terminal of a gate circuit 364 having other input terminals connected to the plate of the left tube in the multivibrator 318 and through the line 224 to the counter 226. The signals from the gate circuits 362 and 364 pass through an "or" network 366 and through the "or" network 356 to the coil 36 for recordation by the coil in the channel 16.

The plate of the left tube in the multivibrator 208 is connected to a gate circuit 370, the operation of which is controlled by a voltage applied through the line 228 from the counter 226. The signals from the gate circuit 370 pass through an "or" network 372 to the coil 46 for recordation by the coil in the channel 20. Similarly, the plate of the left tube in the multivibrator 212 is connected to a gate circuit 374 having another input terminal connected through the line 228 to the counter 226. The signals from the gate circuit 374 pass through an "or" network 375 to the coil 52 for recordation in the channel 22.

The outputs from the carry circuits 320 and 324 are applied to input terminals of "or" networks 376, the output terminal of which is respectively connected to gate circuit 378. The gate circuit 378 also receives voltages from the "or" network 330 (also shown in FIGURE 7) from the plate of the left tube in the multivibrator 360 and through the line 252 from the counter 226. Connections are made to the gate 380 from the "or" network 332, the plate of the left tube in the multivibrator 360 and through the line 252 from the counter 226. The output signals from the gate circuits 378 and 380 pass through an "or" network 382 and the "or" network 372 to the coil 46 for recordation by the coil in the channel 20.

The output signals from the gate circuits 378 and 380 are also applied to gate circuits 384 and 386. Other input terminals of the gate circuits 384 and 386 are respectively connected to the plates of the right and left tubes in the multivibrator 318. The output signals from the gate circuits 384 and 386 pass through an "or" network 388 and the "or" network 375 to the coil 52 for recordation by the coil in the channel 22.

As previously disclosed, a pulse is provided in the channel 16 in one of the first 22 positions for each integrator to control the occurrence of $\Delta x$ increment for the integrator every time that the integrator is presented for computation. The particular position in which the coding pulse is recorded for the integrator undergoing computation is dependent upon which of the other integrators feeds $\Delta x$ increments into the integrator undergoing computation. Since the connections between integrators remains constant during the solution of a problem, the coding pulse in the channel 16 in one of the first 22 positions for each integrator remains constant during the solution of the problem. As a result, these pulses have to be retained during the solution of a problem.

Retention of the pulses in the channel 16 is provided by the multivibrator 318, the gate circuit 354 and the "or" network 356 in FIGURE 8. The pulses in the channel 16 having a first polarity of magnetization are converted by the coil 32 to pulses of relatively high voltage. These voltage pulses are then introduced to the grid of the left tube in the multivibrator 318 so as to cut off the tube. When the left tube in the multivibrator 318 becomes cut off, a high voltage is produced on the plate of the tube and is introduced to the gate circuit 354.

The gate circuit 354 is opened by a signal from the counter 226 when the first pulse in each integrator is picked up by the coil 56. The gate circuit 354 remains open so that information in the channel 16 up to and including the 22nd pulse position for each integrator can pass through the gate circuit. During the time that the gate circuit 354 remains open, the positive pulses from the plate of the left tube in the multivibrator 318 pass through the gate circuit to the "or" network 356. The network 356 in turn passes to the coil 36 any positive pulses introduced to it. In this way, the coil 36 operates to produce a magnetic field in the channel 16 similar to the pattern of the electrical signals induced in the coil 32.

Similarly, the multivibrator 200, the gate circuit 220 and the "or" network 236 in FIGURE 5 operate to recirculate in the channel 14 the information provided in the first 22 positions of each integrator. As previously disclosed, pulses may be provided in the channel 14 in the first 22 positions for each integrator to indicate whether any variations in the value of the dependent quantity $y$ will be made of the integrator.

The gate circuit 238 (FIGURE 5) operates to determine whether or not an actual $\Delta y$ increment is made for an integrator at the time that a coding pulse appears in the channel 14 in one of the first 22 positions for the integrator. The gate circuit 238 receives the coding pulses in the channel 14 because of its connection to the plate of the left tube in the multivibrator 200. The connection from the counter 226 through the line 228 to the gate circuit 238 causes the gate circuit to become open during the first 22 positions of each integrator. The operation of the counter 226 to provide a relatively high voltage during the first 22 positions of each integrator is fully disclosed in co-pending application Serial No. 217,478, filed March 26, 1951, by Steele and Collision.

Since the gate circuit 238 is also connected to the plate of the left tube in the multivibrator 208, it can open for the passage of a signal only when high voltages are simultaneously produced on the plates of the left tubes in the multivibrators 200 and 208. A relatively high voltage is produced on the plate of the left tube in the multivibrator 208 only when a relatively high voltage is induced in the coil 48. As previously disclosed, the coil 48 indicates in adjacent pulse positions any overflow in the value of the cumulative $y\Delta x$ increments which are obtained for each of the 22 integrators in the analyzer.

The passage of a pulse through the gate circuit 238 indicates only the occurrence of a $\Delta y$ increment for an integrator, but it does not indicate whether such increment is positive or negative. The polarity of each pulse passing through the gate circuit 238 is indicated by the gate circuits 242 and 244, both of which receive the signals from the gate circuit 238. Since the gate circuit 242 is connected to the plate of the left tube in the multivibrator 212, it receives a relatively high voltage when a relatively high voltage is induced in the coil 54. As previously disclosed, a high voltage from the coil 54 indicates a positive increment. Since the gate circuit 242 passes a signal only when relatively high voltages are simultaneously introduced to it from the gate circuit 238 and from the plate of the left tube in the multivibrator 212, the gate circuit 242 passes a signal only when a $\Delta y$ increment of positive polarity has occurred.

Each signal passing through the gate circuit 242 for an integrator causes the numerical indications provided by the counter 246 to increase by an integer in a positive direction. For example, a signal passing to the counter 246 from the gate circuit 242 may cause the counter to provide a numerical indication of $+3$ when an indication of $+2$ was provided by the counter. Similarly, the indications in the counter 246 may change from $-3$ to $-2$ upon the introduction of a signal from the gate circuit 242.

As previously disclosed, a positive increment in the cumulative $y\Delta x$ value for an integrator is indicated by the simultaneous occurrence of pulses in the channels 20 and 22. Similarly, a negative increment in the cumulative $y\Delta x$ value for the integrator is indicated by the absence of a pulse in the channel 22 at the time that a pulse is produced in the channel 20. Because of the absence of a pulse in the channel 22, a relatively low voltage is induced in the coil 54. This voltage is inverted by the inverter 214 and is introduced as a relatively high voltage to the grid of the right tube in the multivibrator 212. The trailing edge of this pulse causes the right tube in the multivibrator 212 to become cut off and a high voltage to be produced on the plate of the tube.

When a high voltage is produced on the plate of the right tube in the multivibrator 212 at the same time that a positive pulse passes through the gate circuit 238, the gate circuit 244 opens and passes a signal to the counter 246. This signal provides an indication of a negative $\Delta y$ increment. Since the counter 246 is adapted to provide a negative count as well as a positive count of the $\Delta y$ increments, it operates upon the introduction of signals from the gate circuit 244 to subtract an integer from the resultant value of the counter. For example, the indications in the counter 246 are changed from $+4$ to $+3$ when a signal is introduced to the counter from the gate circuit 244. The operation of the counter 246 in providing a positive and negative count of digital increments is fully disclosed in co-pending application Serial No. 217,478.

The resultant value of $\Delta y$ increments accumulated in the counter 246 for each integrator is made available on a step-by-step basis by the stepping circuit 248. For example, when the resultant value of the $\Delta y$ increment for a particular integrator is $+5$, the circuit 248 indicates a value of $+1$ upon the rotation of the drum 10 past the pulse position which indicates the least significant digit of the number. This corresponds to the value of the least significant digit in the binary information of $+5$. As the drum rotates past the 2nd and 3rd pulse positions, the circuit 248 indicates the values of "0" and "1" respectively. Similarly, for a $\Delta y$ increment of $+3$ for a particular integrator the circuit 248 indicates successive values of "1", "1" and "0" as the drum 10 rotates through successive pulse positions. The operation of a stepping circuit similar to the circuit 248 is fully disclosed in co-pending application, Serial No. 217,478.

The operation of the stepping circuit 248 is controlled by the driver circuit 262, which is in turn operated by signals passing through the "or" network 264. Because of the connection of the "or" network 264 to the plate of the left tube in the multivibrator 232, a signal passes through the "or" network 264 when the left tube n the multivibrator 232 is cut off. The left tube in the multivibrator 232 becomes cut off upon the introduction of a signal from the gate circuit 218.

The gate circuit 218 is so connected to the counter 226 that it cannot open for the passage of a triggering signal until after the 22nd pulse position in the channel 14 for each integrator. When the first positive pulse is induced in the coil 26 for an integrator after the initial 22 pulse positions for the integrator, the gate circuit 218 is opened for the passage of a triggering signal. This signal cuts off the left tube in the multivibrator 232 and causes a high voltage to be produced on the plate of the tube. This high voltage passes through the "or" network 264 and the driver circuit 262 to provide for the operation of the stepping circuit 248.

Since each tube in a multivibrator is triggered by the trailing edge of a pulse, the left tube in the multivibrator 232 becomes triggered only at the end of the first pulse which is induced in the coil 26 after the first 22 pulse positions for each integrator. Because of the control exerted on it by the left tube in the multivibrator 232, the stepping circuit would also be triggered into operation at the end of the first pulse induced in the coil 26 after the first 22 positions for each integrator. For reasons which will be disclosed in detail hereinafter, it is desirable that the stepping circuit 248 be triggered into operation at the beginning of the first pulse in the channel 14 after the first 22 positions for each integrator. This is effectuated by the operation of the gate circuit 266.

The gate circuit 266 operates at the beginning of the first pulse in the channel 14 after the first 22 positions for each integrator, since the plate of the right tube in the multivibrator 232 has a high voltage at this time. The gate circuit 266 is prepared for operation by the counter 226, which introduces a high voltage through the line 224 to the gate circuit 266. The gate circuit passes the first pulse in the channel 14 because of its connection to the plate of the left tube in the multivibrator 200 immediately after the 22nd pulse position for each integrator.

As a result of the operation of the gate circuit 266, the stepping circuit 248 becomes triggered into operation one pulse position before the adder 230 is triggered into operation by the plate of the left tube in the multivibrator 232. In order for the information relating to the $\Delta y$ increments to pass from the stepping circuit 248 in proper sequence with the operation of the adder 230, the information in the stepping circuit 248 is introduced to the multivibrator 250.

Since the tubes in the multivibrator 250 are triggered into operation by the trailing edge of the pulse indications in the stepping circuit 248, the multivibrator 250 operates to delay by one pulse position the information in the circuit 248. By delaying the information from the stepping circuit 248 by one pulse position, the multivibrator 250 produces a proper synchronization between the information from the stepping circuit and the other information introduced to the adder 230. The left tube in the multivibrator 250 provides an indication of the integer "+1" for each binary position when its voltage is high, and the right tube provides an indication of the value "0" when its voltage is high.

The production of a relatively high voltage on the plate of the left tube in the multivibrator 232 causes the adder 230 to be triggered into operation. After the adder 230 has been triggered into operation, it receives binary indications of the value of the dependent quantity $y$ for each integrator. The adder receives indications representing the integer "1" from the gate circuit 218 and indications representing the value "0" from the gate circuit 222. The operation of the gate circuits 218 and 222 is in turn controlled by the voltages on the plates of the left and right tubes in the multivibrator 200.

The adder 230 arithmetically combines the value of the dependent quantity $y$ for each integrator with the value of the $\Delta y$ increments passing through the multivibrator 250. The arithmetical combination of the values of $y$ and $\Delta y$ are obtained for each pulse position in sequence as the drum 10 rotates. For example, the arithmetical combination of the indications of $y$ and $\Delta y$ in the 25th pulse position for a particular integrator may first be obtained. The arithmetical combination of the values of $y$ and $\Delta y$ may thereafter be sequentially obtained for the 26th and the following pulse positions for the integrator.

Sometimes, upon the arithmetical combination of the values of $y$ and $\Delta y$ for a particular pulse position, the adder 230 may obtain a full binary indication of +2. In binary form, an indication of +2 is equivalent to a value of "0" for the pulse position and a carry of +1 to the next highest digit. For example, when a binary indication of "1" for $y$ in the 26th position is added to a binary indication of "1" for $\Delta y$ in the same position, the resultant value may be "0" in the 26th position with a carry of "1" into the 27th position. This carry is provided by the circuit 254.

A carry may also be provided from a first pulse position to the next position when a carry from the position immediately preceding the first position is added to the integer "1" indicating the value of either $y$ or $\Delta y$ for the first position. For example, a carry may be provided from pulse position 29 to pulse position 30 as a result of an addition in pulse position 29. The addition of this carry indication with an integer "1" indicating the value of the dependent quantity $y$ for pulse position 30 causes a carry to be obtained for pulse position 31.

By arithmetically combining the values of $y$, $\Delta y$ and the carry indication for each pulse position, a new value of $y$ is obtained. The new indication of $y$ for each pulse position passes sequentially through the "or" network 236 and produces a corresponding signal pattern in the coil 30. This signal pattern causes the coil 30 to record in the channel 14 the new value of $y$ for each pulse position. The information relating to the new value of $y$ subsequently passes through the gate circuits 218 and 222 for utilization by the adder 230. After the information has been utilized by the coil 26, it is erased by the coil 28.

The binary information passing through the stepping circiut 248 is not only introduced to the adder 230 but is also introduced to the adder 258. Since the information in the stepping circuit 248 is introduced to the adder 258 one pulse position before it is introduced to the adder 230, the information passing from the stepping circuit 248 to the adder 258 represents a value equal to ½ of that passing to the adder 230. In this way, the information passing from the stepping circuit 248 to the adder 258 for each integrator represents a value equal to ½ of the $\Delta y$ increments for the integrator upon the presentation of the integrator for computation.

The adder 258 arithmetically combines the information from the stepping circuit 248 with the numerical information in the channel 18. As has previously been disclosed, the numerical information in the channel 18 for certain integrators represents a value equal to ½$\Sigma\Delta y$ for the integrators. By combining the information from the stepping circuit 248 with the information in the channel 18 for each integrator, the adder 258 obtains a new value of ½$\Sigma\Delta y$ for the integrator. This value is obtained from the time that a previous $\Delta x$ increment has occurred for the integrator. The new indications obtained by the adder 258 pass through the gate circuit 268 and the "or" network 274 to the coil 42 for recordation by the coil in the channel 18. The operation of the gate circuit 268 will be disclosed in detail subsequently.

The operation of the adder 258 to obtain new indications may be represented by the logical equation $$E_n = S_{dr}(B_1 E D_e + B E' D_e + B_1' E D_e' + B_1' E' D_e)$$

where $E_n$ represents a relatively high voltage produced by the adder 258 for a pulse position to indicate the integer "1" for the position; $S_{dr}$ represents a high voltage from the driving circuit 262; $B_1$ represents a high voltage from the stepping circuit 248 to indicate the integer "1," E represents a high voltage from the plate of the left tube in the multivibrator 204; and $D_e$ represents a positive carry from the circuit 260; and $B_1'$, $E'$ and $D_e'$ respectively represent the inverse of $B_1$, E and $D_e$ to indicate the value "0" for a pulse position.

The occurrence of each $\Delta x$ increment for an integrator and the polarity of each such increment are determined in a manner similar to that disclosed above for the $\Delta y$ increments. Thus, a $\Delta x$ increment for an integrator occurs when a pulse of relatively high voltage is induced in the coil 48 (FIGURE 6) at the instant that a pulse is induced in the coil 32 in one of the first 22 positions for the integrator. Similarly, the $\Delta x$ increment is positive when a pulse is induced in the coil 54 at the instant that pulses are induced in the coils 32 and 48. The $\Delta x$ increment is negative if a pulse is not induced in the coil 54 at the instant that pulses are induced in the coils 32 and 48.

As previously disclosed, the pulses induced in the coil 32 are introduced to the grid of the left tube in the multivibrator 318 (FIGURE 7) to cut off the tube in a pattern corresponding to the pattern of magnetic pulses in the channel 16. The positive pulses produced on the plate of the left tube in the multivibrator 318 are introduced to the gate circuit 346. Since the gate circuit 346 is also connected through the line 228 to the counter 226, it is prepared to open for the passage of a signal during the first 22 pulse positions of each integrator.

Because of its connection to the plate of the left tube in the multivibrator 212, the gate circuit 346 becomes open only when a pulse appears in the channel 22 simultaneously with the appearance of the coding pulse in the channel 16. Such a simultaneous occurrence of pulses in the channels 16 and 22 for an integrator indicates that a $\Delta x$ increment for the integrator is positive.

Upon the passage of a signal through the gate circuit 346, the left tube in the multivibrator 300 becomes cut off. The left tube in the multivibrator 300 remains cut off during the rest of the time that the particular integrator is presented for computation. At pulse position 48 of the integrator, a signal is introduced from the counter 226 through the line 252 to the grid of the right tube in the multivibrator 300 so as to cut off the tube. When the right tube in the multivibrator becomes cut off, the left tube starts to conduct. This causes the left tube in the multivibrator 300 to be prepared for triggering by a signal passing through the gate circuit 346 during the first 22 positions of the next integrator to be presented for computation.

When the left tube in the multivibrator 300 is cut off, a relatively high voltage is introduced from the plate of the tube to input terminals of the gate circuits 334 and 338. The gate circuit 334 also receives signals from the gate circuit 218, which operates after the first 22 positions for each integrator to pass the pulses of high voltage induced in the coil 26. As previously disclosed, these pulses provide an indication representing the integer "1" for different pulse positions in the channel 14 for each integrator. Since such indications represent the dependent quantity y for each integrator, they may be designated by "Y" in conformity with the designations provided in copending application, Serial No. 217,478.

When relatively high voltages are simultaneously introduced to the gate circuit 334 from the gate circuit 218 and the plate of the left tube in the multivibrator 300, the gate circuit passes a signal to the "or" network 330. Since the gate circuit 218 passes signals indicative of "Y" and the left tube in the multivibrator 300 indicates $+\Delta x$ when its voltage is high, each signal passing to the "or" network 330 indicates the value (Y) ($\Delta x$) for a particular pulse position. The value (Y) ($\Delta x$) is an "and" proposition which is true when only both Y and $\Delta x$ are simultaneously true. The value (Y) ($\Delta x$) corresponds in binary form to the integer "1" for different pulse positions.

For a value of "0" for a pulse position, a relatively low voltage is induced in the coil 26. This low voltage is inverted by the inverter 202 and is introduced as a relatively high voltage to the grid of the right tube in the multivibrator 200 to cut off the tube. The resultant positive pulse on the plate of the right tube in the multivibrator 200 passes through the gate circuit 220. In this way, the pulses passing through the gate circuit 220 indicate a value of Y' for different pulse positions, where Y' is the inverse of the value Y and indicates the integer "0" for the different pulse positions. This causes the signals passing through the gate circuit 338 to provide an indication of (Y') ($\Delta x$) for the different pulse positions. These signals pass to the "or" network 332.

Since the left tube in the multivibrator 300 is triggered into a state of non-conductivity only for positive $\Delta x$ increments, the right tube in the multivibrator remains cut off for negative $\Delta x$ increments. When a $\Delta x$ increment is negative, a relatively high voltage is introduced from the plate of the right tube in the multivibrator 300 to the gate circuits 336 and 340. Because of its connection to the gate circuit 218, the gate circuit 336 passes signals only for pulse positions in which a relatively high voltage is induced in the coil 26. Thus the signals passing through the gate circuit provide an indication of (Y) ($-\Delta x$).

As is well known, (Y) ($-\Delta x$) is arithmetically equivalent to ($-Y$) ($\Delta x$). As will be disclosed in detail hereinafter, $-Y$ is equivalent to $+Y'$. Thus the signals passing through the gate circuit 336 effectively provide an indication of Y' ($\Delta x$) and correspond to the signals passing through the gate circuit 338. The signals from the gate circuits 336 and 338 may be designated as $Y_a'$ in a manner similar to that disclosed in co-pending application Serial No. 217,478 and shown in FIGURES 45 and 46 of the co-pending application. These signals are introduced to the gate circuit 328 (FIGURE 6) after passing through the "or" network 332.

In like manner, the signals passing through the gate circuit 340 provide an indication of (Y') ($-\Delta x$). Since Y' is equivalent to $-Y$, (Y') ($-\Delta x$)=(Y) ($\Delta x$). Thus, the signals passing through the gate circuit 340 correspond to the signals passing through the gate circuit 334 and provide an indication of a value designated as $Y_a$ in co-pending application Serial No. 217,478. The signals from the gate circuits 334 and 340 pass through the "or" network 330 to the gate circuit 326 (FIGURE 6).

The gate circuits 326 and 328 become opened only after the left tube in the multivibrator 232 has been triggered into a state of non-conductivity by the first pulse in the channel 14 after the 22nd pulse position for each integrator. Since this pulse indicates that the pulses which follow in the channel 14 represent the numerical value of the dependent quantity y for the integrator, the gate circuits 326 and 328 pass information relating only to the numerical values of $Y_a$ and $Y_a'$, respectively.

The values of $Y_a$ and $Y_a'$ for each integrator represent the $y\Delta x$ increment for the integrator undergoing computation. As previously disclosed, each $y\Delta x$ increment may have an error when the value of y is determined at either the beginning of the $\Delta x$ increment or at the end of the $\Delta x$ increment. A relatively accurate approximation in the value of y over the $\Delta x$ increment can be obtained for many integrators by determining the value of y at an intermediate position in the $\Delta x$ increment.

Often in the operation of a particular integrator in a complex interconnection of integrators, the integrator receives $\Delta y$ increments from other integrators undergoing the same cycle of computation. For example, in a particular interconnection, integrator "15" may have its $\Delta y$ increments controlled by the output from integrator "9." Since the output of integrator "9" is obtained before the output of integrator "15," integrator "9" offers relatively fresh information to integrator "15" when integrator "15" is presented for computation. The information obtained by integrator "9" is offered to integrator "15" in the same cycle of computation that it is obtained.

In the above example, an approximation in the value of y over the range of a Δx increment is obtained by determining the value of y intermediate between the value of y at the beginning of the Δx increment and the value of y at the end of the increment. If the incremental value of y is expressed as ½ΣΔy, the intermediate value of y may be expressed as $y_n - \frac{1}{2}\Sigma\Delta y$. In the above expression, $y_n$ indicates the value of y at the end of the Δx increment.

When the value of $y_n - \frac{1}{2}\Sigma\Delta y$ is to be obtained for an integrator, the second pulse position in the channel 18 for the integrator is provided with a permanent magnetic pulse of a polarity to induce a high voltage in the coil 38. The third pulse position in the channel 18 for each integrator is provided with a magnetic pulse of the opposite polarity so as to induce a low voltage in the coil 38. This combination of pulses in the second and third pulse position in the channel 18 for an integrator provides a code to indicate that $y_n - \frac{1}{2}\Sigma\Delta y$ is to be obtained for the integrator. The combination of coding pulses for obtaining $y_n - \frac{1}{2}\Sigma\Delta y$ is indicated in FIGURE 13.

Since the coding pulses in the second and third pulse positions for each integrator remain constant during the solution of a problem, they are recirculated in the channel 18. Recirculation of this information is provided by the multivibrator 204, (FIGURE 5), the gate circuit 276, the "or" network 274 and the coil 42 in a manner similar to that disclosed above with respect to the information in the channels 14 and 16.

The gate circuit 282 (FIGURE 6) is connected to the counter 226 to open in the second pulse position for each integrator. Since the gate circuit is also connected to the plate of the left tube in the multivibrator 204, a signal passes through the gate circuit in the second pulse position when the left tube in the multivibrator 204 becomes cut off at this position. As previously disclosed, the left tube in the multivibrator 204 becomes cut off at the second pulse position for an integrator when the value of $y_n - \frac{1}{2}\Sigma\Delta y$ is to be obtained for the integrator.

The signal passing through the gate circuit 282 causes the left tube in the multivibrator 290 to become cut off and a high voltage to be produced on the plate of the tube. When a high voltage is produced on the plate of the left tube in the multivibrator 290 at the second pulse position for an integrator, it remains until the last pulse position in the integrator. At the last pulse position in the integrator, a pulse passes from the counter 226 through the line 252 to the grid of the right tube in the multivibrator 290 and causes the right tube to become cut off. When the right tube in the multivibrator 290 becomes cut off, the left tube starts to conduct and causes a relatively low voltage to be produced on the plate of the tube. In this way, the multivibrator 290 is prepared at the end of each integrator to be triggered in accordance with the coding provided in the channel 18 for the next integrator.

The high voltage produced on the plate of the left tube in the multivibrator 290 after the second pulse position for an integrator is introduced to the gate circuit 306. Since the gate circuit 306 also has a voltage introduced to it from the driver circuit 262, a signal passes through the gate circuit immediately after the 22nd pulse position for an integrator. This signal is introduced to the gate circuits 307, 308, 309 and 310 to open the gate circuits for the passage of information from the adder 258.

The gate circuits 307, 308, 309 and 310 operate in a manner similar to that disclosed above for the gate circuits 334, 336, 338 and 340 shown in FIGURE 7. Since the gate circuits 307 and 310 receive signals from the plate of the left tube in the multivibrator 300, they pass signals only when a positive Δx increment has occurred for an integrator. Similarly, the gate circuits 308 and 309 pass signals only when a negative Δx increment has occurred for an integrator.

In addition to receiving signals from the gate circuit 306 and the plate of the left tube in the multivibrator 300, the gate circuit 307 receives from the adder 258 signals of low voltage representing the integer "0" for certain pulse positions. Since the value of ½ΣΔy is to be subtracted, these signals pass through the "or" network 314 as signals of high voltage representing the integer "1" for the pulse positions.

Signals representing the integer "0" for different pulse positions are also introduced to the gate circuit 308. Since the value of ½ΣΔy is to be subtracted from the particular integrator undergoing computation, these signals would ordinarily be inverted to obtain signals having high voltages to represent the integer "1" for the pulse positions. However, a signal representing a negative Δx increment is also introduced to the gate circuit 308 from the plate of the right tube in the multivibrator 300. The negative sign of the Δx increment in effect causes the negative sign representing the subtraction of ½ΣΔy to be nullified. In this way, the signals of low voltage representing the value "0" for the different pulse positions pass through the gate circuit 308 to the "or" network 312 as signals which still represent the value "0" for the pulse positions.

In like manner, signals of high voltage representing the integer "1" are introduced from the adder 258 to the gate circuit 310. Since a signal representing a positive Δx increment is also introduced to the gate circuit 310 from the plate of the left tube in the multivibrator 300 the signals from the adder 258 pass through the gate circuit 310 to represent the value "0" for the pulse positions. The inversion takes place because of the subtraction of the value of ½ΣΔy that is to be made. These signals pass to the "or" network 312 since this network receives signals representing the value "0" for different pulse positions.

The gate circuit 309 also receives signals of high voltage from the adder 258 to represent the integer "1" for different pulse positions. The gate circuit passes these signals to the "or" network 314 as indications of the integer "1" for the pulse positions. No inversion takes place because of the introduction of a signal from the plate of the right tube in the multivibrator 300 to indicate a negative Δx increment. This negative sign in effect cancels the negative sign representing the subtraction of ½Δy and in effect causes the signals for the different pulse positions to pass through the gate circuit 309 in their true form.

As disclosed above, the information from the adder 258 passes through the "or" networks 312 and 314 to the adder 319. The adder 319 combines this information with the information representing the cumulative value of yΔx increments in the channel 16 for each integrator. The operation of the adder 319 and of the gate circuits 306, 307, 308, 309 and 310 in passing certain information from the adder 258 to the adder 319 may be given by the following logical equation:

$$R_s = S_{dr}M_2B_s(R'E_n'D_s' + R'E_nD_s + RE_n'D_s + RE_nD_s') \\ + S_{dr}M_2B_s'(R'E_nD_s' + R'E_n'D_s + RE_nD_s + RE_nD_s')$$

In the above equation, $R_s$ = a relatively high voltage passing through the adder 319 for a pulse position; $S_{dr}$ = a relatively high voltage from the driver circuit 262 to indicate all pulse positions for an integrator after the start pulse for the integrator and including the position of the start pulse itself; $M_2$ = a relatively high voltage from the plate of the left tube in the multivibrator 290; $R$ = a relatively high voltage from the plate of the left tube in the multivibrator 318 to indicate that the cumulative value of the yΔx increments has a value of "1" for the particular pulse position; $E_n$ = a relatively high voltage from the adder 258 to indicate that the cumulative value of the ½Δy increments (in other words ½ΣΔy) has a value of "1" for the particular pulse position; $D_s$ = a positive carry signal from the circuit 320 for the particular position; and the "+" sign indicates a logical "or" relationship where $R_s$ is true when any of the above expressions is true. Furthermore, $B_s$ indicates a relatively high voltage from the plate of the left tube in the multivibrator 300 to indicate that a positive $\Delta x$ increment has occurred. Similarly, $B_s'$ indicates a relatively high voltage from the plate of the right tube in the multivibrator 300 to indicate that a negative $\Delta x$ increment has occurred.

The information from the adder 319 is introduced to the adder 322, which combines it with the information passing to it from the gate circuits 326 and 328. Since the gate circuits 326 and 328 are connected to the plate of the left tube in the multivibrator 232, they open only after the 22nd pulse position for each integrator. When the gate circuits 326 and 328 open, they pass the information from the "or" networks 330 and 332, respectively. As previously disclosed, the "or" networks provide information relating to $Y_a$ and $Y_a'$, where the values $Y_a$ and $Y_a'$ represent the last $y\Delta x$ increment that is obtained for the integrator.

When the adder 322 combines the information from the adder 319 with the information from the gate circuits 326 and 328, it obtains a new value representing the cumulative $y\Delta x$ increments for each integrator. Because of the subtraction of a value equal to $\frac{1}{2}\Sigma\Delta y$ for an integrator from the information introduced to the adder 319, the indications obtained by the adder 322 represent an accurate approximation in the true value of the differential combination for the integrator. As will be disclosed in detail hereinafter, the information obtained by the adder 322 is recorded in the channel 16 when a $\Delta x$ increment actually occurs for the integrator.

The operation of the adder 322 is indicated by the following logical equation:

$$R_n = S_{dr}(R_s Y_a D_r + R_s Y_a' D_r' + R_s' Y_a' D_r + R_s' Y_a D_r')$$

In the above equation:

$R_n$ = a relatively high voltage produced by the adder 322 for a particular pulse position to indicate the integer "1" for the position;

$D_r$ = a positive carry signal from the circuit 324 for the particular position; and $Y_a$, $R_s$ and $S_{dr}$ have previously been defined.

Sometimes an integrator is so connected that it receives $\Delta y$ increments from an integrator in a previous cycle of computation. For example, integrator "3" may receive its $\Delta y$ increments from the output of integrator "18." In such a situation, integrator "3" receives in one cycle of computation the output from integrator "18" which has been obtained in a previous cycle of computation. Because of this, the value of $y$ always lags by one cycle of computation the value which should accurately be obtained.

Figure 3:
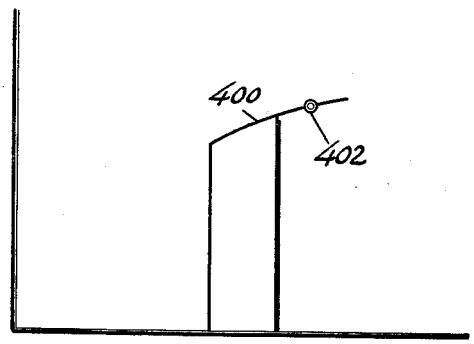

For example, a value of the dependent quantity $y$ indicated at 400 may be obtained for integrator "3" at the end of a cycle of computation. However, when integrator "3" receives $\Delta y$ increments from the output of integrator "18," the value of $y$ may actually be slightly greater than the value obtained since integrator "3" has received one cycle more of computation than integrator "18." The actual value may be slightly greater than the value indicated at 400, as indicated at 402 in FIGURE 3. In order for an accurate approximation to be made for the value of y in each cycle of computation, $\frac{1}{2}\Sigma\Delta y$ is added to the value of $y$ at the end of the $\Delta x$ increment. In this way, a value approximating that indicated at 402 is obtained.

When a value of $+\frac{1}{2}\Sigma\Delta y$ is to be obtained for an integrator, pulses of a particular polarity are provided in the second and third pulse positions in the channel 18 for the integrator to induce low voltages in the coil 38. These low voltages cause the right tubes in the multivibrators 270 and 290 to remain cut off, as indicated by the chart in FIGURE 13. The resultant high voltages on the plates of the right tubes in the multivibrators 270 and 290 are introduced to the gate circuit 294 (FIGURE 6). Since the gate circuit 294 is also connected to the driver circuit 262, a signal passes through the gate circuit 294 immediately after the 22nd pulse position for the integrator.

The signal passing through the gate circuit 294 opens the gate circuits 296, 297, 298 and 299 for the passage of information from the adder 258. Since the gate circuits 296 and 299 and the gate circuits 297 and 298 also respectively receive voltages from the plates of the left and right tubes in the multivibrator 300, the gate circuits operate in a manner similar to that disclosed above for the gate circuits 307, 308, 309 and 310. However, because of the addition of $\frac{1}{2}\Sigma\Delta y$, the inversion of the signal indications from the adder 258 does not take place when a positive $\Delta x$ increment occurs, as indicated by a high voltage on the plate of the left tube in the multivibrator 300. The inversion of the signal indications from the adder 258 takes place only when a negative $\Delta x$ increment occurs, as indicated by a high voltage on the plate of the right tube in the multivibrator 300.

The information passing through the gate circuits 297 and 298 is introduced to the "or" network 312, and the information passing through the gate circuits 296 and 299 is introduced to the "or" network 314. The information passing through the "or" networks 312 and 314 is in turn arithmetically combined by the adder 319 with the information which is introduced to the adder from the multivibrator 318 and which represents the cumulative value of the $y\Delta x$ increments for each integrator in the channel 16. The output from the adder 319 may be represented by the following logical equation:

$$R_s = S_{dr} M_2' M_3' B_s (RE_n D_s + RE_n' D_s' + R'E_n' D_s' + R'E_n D_s) \\ + S_{dr} M_2' M_3' B_s' (RE_n' D_s + RE_n D_s' + R'E_n' D_s' + R'E_n D_s)$$

In the above expression:

$M_2'$ = a relatively high voltage from the plate of the right tube in the multivibrator 290;

$M_3'$ = a relatively high voltage from the plate of the right tube in the multivibrator 270; and $B_s$, $R_s$, $S_{dr}$, $R$, $E_n$ and $D_s$ have previously been defined.

Figure 4:
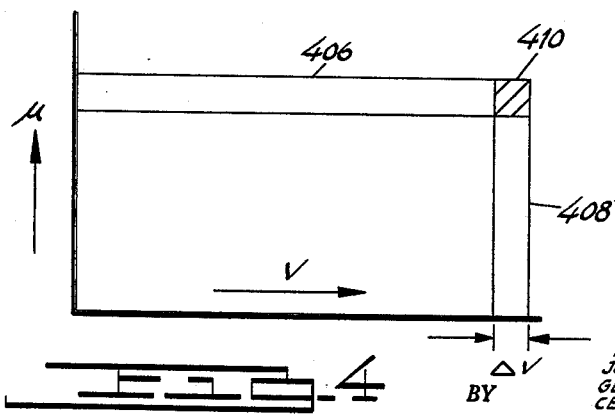

Certain integrators may obtain the product of two quantities $u$ and $v$. To obtain the product $(u)$, $(v)$, two integrators are interconnected so that one obtains the product $(v)$ $(\Delta u)$ and the other obtains the product $(u)$ $(\Delta v)$. The product of $(v)$ $(\Delta u)$ obtained by one integrator is indicated at 406 in FIGURE 4, and the product of $(u)$ $(\Delta v)$ is indicated at 408. As will be seen in FIGURE 4, the product obtained by each of the two integrators includes the shaded area indicated at 410. Since the shaded area 410 should be included only once, the resultant solution obtained by the two integrators is too large.

By subtracting one half of the shaded area from the indications obtained by each of the two integrators, a proper solution in the product $(u)$ $(v)$ is obtained. This is accomplished by subtracting $\frac{1}{2}\Delta u$ from the integrator obtaining the solution $(u)$ $(\Delta v)$ and by subtracting $\frac{1}{2}\Delta v$ from the integrator obtaining the solution $(v)$ $(\Delta u)$. As will be noted, only a value equal to $\frac{1}{2}\Delta u$ is subtracted from one integrator rather than a value equal to $\frac{1}{2}\Sigma\Delta u$, and only a value equal to $\frac{1}{2}\Delta v$ is subtracted from the other integrator. Thus, if a $\Delta v$ increment does not occur for several cycles of computation, only the $\Delta u$ increment in the last cycle of computation is utilized to obtain the value $\frac{1}{2}\Delta u$.

As will be disclosed in detail hereinafter, the adder 258 provides only an indication of $\frac{1}{2}\Delta y$ for each integrator which operates in conjunction with another integrator to obtain the product between 2 quantities. Since the added 258 automatically operates to obtain the value of $\frac{1}{2}\Delta y$, the introduction of the value to the adder 300 causes the adder 300 to obtain the value $R - \frac{1}{2}\Delta y$ when the gate circuit 306 becomes opened. By coding the 2nd pulse position in the channel 18 for the particular integrator to obtain a relatively high voltage on the plate of the left tube in the multivibrator 290, the gate circuit 306 can be made to open. This coding is illustrated in the chart shown in FIGURE 13. The gate circuit 306 opens and prepares the gate circuits 307, 308, 309 and 310 for opening when either ½Δy or ½ΣΔy is to be subtracted from R.

Sometimes an integrator is used as a servo to obtain a comparison between two values. Since the integrator is being used for purposes of comparison, it is not necessary for the dependent quantity y to be altered in any manner. Thus, adjustments of ½Δy and ½ΣΔy do not have to be made for an integrator which operates as a servo.

Since no correction has to be made, the pulses representing the value of R pass through the adder 319 without change. The pulses pass through the adder 319 without change since no information is able to pass through the "or" networks 312 and 314. This results from the fact that the gate circuits 294 and 306 are not activated, these gate circuits becoming activated only for particular patterns of operation of the multivibrators 270 and 290 as set forth in FIGURE 3. Inactivation of the gate circuit 194 prevents the gate circuits 296, 297, 298 and 299 from passing signals to the "or" networks 312 and 314. Similarly, inactivation of the gate circuit 306 prevents the gate circuits 307, 308, 309 and 310 from passing information to the "or" networks 312 and 314.

As disclosed above, the cumulative value of ½ΣΔy is obtained for an integrator as a corrective factor when the integrator is being used in its normal function to obtain the cumulative value of the yΔx increments. The corrective factor represented by ½ΣΔy is accumulated in the channel 18 from the time that a first Δx increment is produced for the integrator until the time that the next Δx increment is produced for the integrator. The cumulative value represented by ½ΣΔy is obtained by the operation of the stepping circuit 248 (FIGURE 5), the adder 258, and the carry circuit 260.

As previously disclosed, the stepping circuit 248 becomes operative at the beginning of the first pulse in the channel 14 after the first 22nd pulse positions for each integration. This is accomplished by the operation of the driver circuit 262, which is triggered into operation by the gate circuit 266 at the beginning of the first pulse after the 22nd pulse position for each integrator. Since the stepping circuit is effectively triggered into operation one pulse position early, it indicates in successive pulse positions a value of ½Δy which is obtained for an integrator upon the presentation of the integrator for computation.

The indications of ½Δy for each pulse position are combined with the indications stored in the channel 18 for corresponding pulse positions and with the indications from the carry circuit 260. As previously disclosed, the indications stored in different pulse positions in the channel 18 for an integrator represents a value of ½ΣΔy which has previously been obtained for the integrator. By combining the different indications introduced to it, the adder 258 obtains indications representing a new value of ½ΣΔy for each pulse position in the integrator.

The operation of the adder 258 is indicated by the following logical equation:

$$E_n = S_{dr}(B_1 E D_e + B_1 E' D_e' + B_1' E D_e' + B_1' E' D_e)$$

In the above equation:

$B_1$ = a relatively high voltage from the stepping circuit 248 for a particular pulse position to indicate the integer "1" for the position;

$E$ = a relatively high voltage from the plate of the left tube in the multivibrator 204 for the particular pulse position to indicate the integer "1" for the position;

$D_e$ = a positive carry signal from the circuit 260 for the particular position; and $E_n$ and $S_{dr}$ have previously been defined.

The indications obtained by the adder 258 for the different pulse positions for an integrator are introduced to the gate circuit 268. Since the gate circuit 268 has an input terminal connected to the plate of the right tube in the multivibrator 270, the gate circuit 268 opens only when the voltage on the plate of the right tube in the multivibrator 270 is relatively high. As previously disclosed, the plate of the right tube in the multivibrator 270 has a relatively high voltage only when a corrective value of ½ΣΔy is to be added to the value of y or subtracted from the value of y.

Because of its connection to the plate of the right tube in the multivibrator 360, the gate circuit 268 passes information only when the voltage on the plate of this tube is relatively high. As will be disclosed in detail hereinafter, the voltage on the plate of the right tube in the multivibrator 360 is high for an integrator only when a Δx increment does not occur for the integrator. The gate circuit 268 opens only for the pulse positions which provide indications representing the numerical value of ½ΣΔy. The gate circuit 268 opens only in these pulse positions because of its connection through the line 273 to the counter 226.

The signals passing through the gate circuit 268 are introduced through the "or" network 274 to the coil 42 for recordation in the channel 18. These signals represent the new value of ½ΣΔy for an integrator. When the integrator is subsequently presented for computation, the indications recorded in the channel 18 by the coil 42 produce a corresponding voltage pattern in the coil 38. The signals induced in the coil 38 are then introduced to the adder 258 for arithmetical combination with new information representing ½Δy in the stepping circuit 248.

Because of the operation of the multivibrator 270, the gate circuit 268 does not pass any information when a corrective value of ½Δy is to be obtained for an integrator. As previously disclosed, a corrective value of ½Δy is obtained for an integrator when the integrator operates in conjunction with another integrator to obtain the product of two quantities. Furthermore, the gate circuit 268 does not pass any information to the coil 42 for an integrator which operates as a servo. Since the gate circuit 268 does not pass any indications for such integrators, a relatively low voltage is produced in the pulse positions in the channel 18 for such integrators.

The information passing through the gate circuit 268 to the coil 42 for recordation in the channel 18 is indicated by the following logical equation:

$$E_0 = M_3' B_7' E_n P_{23-48}$$

Where:

$M_3'$ = a relatively high voltage on the plate of the right tube in the multivibrator 270 to indicate that a corrective factor of ½ΣΔy is to be obtained for a particular integrator;

$B_7'$ = a relatively high voltage on the plate of the right tube in the multivibrator 360 to indicate that a Δx increment has not been obtained for the particular integrator upon the presentation of the integrator for computation;

$P_{23-48}$ shows that the indications can pass through the gate circuit 268 only after pulse position 22 for the integrator;

$E_0$ = a relatively high voltage passing to the coil 42 to indicate the integer "1"; and $E_n$ has previously been defined as a relatively high voltage from the adder 258 to indicate the integer "1."

The operation of the adder 322 (FIGURE 6) has previously been disclosed in detail and the output from the adder has been indicated in the form of a logical equation. The output from the adder 322 is introduced to the gate circuit 362 (FIGURE 7). Because of its connection through the line 224 to the counter 226, the gate circuit 362 is prepared for opening only after the 22nd pulse position for each integrator. The gate circuit becomes open for the passage of signals in these pulse positions only when relatively high voltages are simultaneously introduced to it from the adder 322 and from the plate of the left tube in the multivibrator 360.

Because of the connection to the grid of the left tube in the multivibrator 360 from the gate circuit 358, the left tube in the multivibrator 360 becomes cut off only when an actual Δx increment occurs for an integrator. The left tube in the multivibrator 360 becomes cut off only when an actual Δx increment occurs, since the gate circuit 358 opens and passes a signal only upon the occurrence of an actual Δx increment.

Since the gate circuit 358 is connected through the line 228 to the counter 226, it becomes prepared for opening only during the first 22 pulse positions of each integrator. The gate circuit also receives the pulses of relatively high voltage which are induced in the coil 32, since the gate circuit is connected to the plate of the left tube in the multivibrator 318. Such pulses include a coded indication in the first 22 pulse positions for each integrator that a Δx increment may actually occur for the integrator.

The gate circuit 358 also receives the pulses of relatively high voltage appearing on the plate of the left tube in the multivibrator 208. As previously disclosed, the left tube in the multivibrator 208 is cut off in a pattern dependent upon the magnetic pulses appearing in the channel 20 and induced as electrical pulses in the coil 48. Each of the pulses in the channel 20 provides an indication of an actual Δx increment for an integrator when it coincides with a pulse appearing in the channel 16 in one of the first 22 pulse positions for the integrator. Since the gate circuit 358 opens upon the simultaneous occurrence of pulses in the channels 16 and 20 during the first 22 pulse positions for each integrator, a signal passing through the gate circuit 358 for an integrator provides an indication that a Δx increment has actually occurred for the integrator.

Upon the passage of a signal through the gate circuit 358, the left tube in the multivibrator 360 becomes cut off so as to prepare the gate circuit 362 for opening. The gate circuit 362 opens after the 22nd pulse position for each integrator and passes the information produced by the adder 322. This information passes through the "or" network 366 and the "or" network 356 for recordation by the coil 36 for the cumulative value of the yΔx increments for each integrator when a Δx increment actually occurs for the integrator.

After the gate circuit 362 has been opened for the passage of information for a particular integrator, it remains open until the 48th pulse position for the integrator is presented for utilization. Upon the presentation of the 48th pulse position for the integrator, the gate circuit 362 closes because of its connection through the line 224 to the counter 22. After the gate circuit 362 has closed, the right tube in the multivibrator 360 is triggered into a state of non-conductivity as a result of a signal introduced to the grid of the tube through the line 252 from the counter 226.

When the right tube in the multivibrator 360 becomes cut off, the left tube starts to conduct and causes a relatively low voltage to be produced on its plate. This low voltage prevents any information from passing through the gate circuit 362 for the next integrator to be presented for computation unless an actual Δx increment is obtained for that integrator. If an actual Δx increment occurs for the integrator, a signal passes through the gate circuit 358 in a manner similar to that disclosed above and triggers the left tube in the multivibrator 360 into a state of non-conductivity.

As may be seen in FIGURE 2, a differential combination of yΔx should be obtained only when an actual Δx increment occurs. For example, a yΔx increment indicated by the shaded area 178 in FIGURE 2 is obtained when an actual Δx increment indicated at 412 occurs. If an actual Δx increment does not occur for an integrator upon the presentation of the integrator for computation, the cumulative value of the yΔx increments for the integrator should remain unchanged. This is accomplished in the analyzer constituting this invention by closing the gate circuit 362 (FIGURE 8) and opening the gate circuit 364 when a Δx increment does not actually occur for an integrator.

As previously disclosed, the plate of the left tube in the multivibrator 360 continues to conduct when an actual Δx increment does not occur for an integrator. The resultant relatively low voltage on the plate of the left tube in the multivibrator 360 prevents the gate circuit 362 from opening to pass the new information obtained by the adder 322. Since the right tube in the multivibrator 360 is cut off during the time that the left tube is conducting, a relatively high voltage is produced on the plate of the right multivibrator tube. This voltage is introduced to the gate circuit 364 to prepare the gate circuit for opening.

Because of the connection to the gate circuit 364 through the line 224 from the counter 226, the gate circuit is able to open only after the 22nd pulse position for each integrator. In this way, the pulses of relatively high voltage appearing on the plate of the left tube in the multivibrator 318 are able to pass through the gate circuit 364 after the 22nd pulse position for each integrator. Since voltage pulses are produced on the plate of the left tube in the multivibrator 318 in a pattern corresponding to that induced in the coil 32, the pulses appearing in the channel 16 are introduced to the gate circuit 364. This causes the pulses appearing in the channel 16 to pass through a circuit including the coil 32, the multivibrator 318, the gate circuit 364, the "or" networks 366 and 356 and the coil 36 after the 22nd pulse position for an integrator when a Δx increment has not actually been obtained for the integrator. The pulses introduced to the coil 36 are recorded in the channel 16 and are subsequently presented again to the coil 32 for utilization.

The output from the carry circuit 324 is introduced through the "or" network 376 to the gate circuit 378. Because of its connection through the line 252 to the counter 226, the gate circuit is prepared for opening only during the 48th pulse position of each integrator. In this way, the gate circuit is able to pass only a carry indication which is obtained by the arithmetical combination of the different values in the 47th pulse position for each integrator and which is carried to the 48th pulse position for the integrator. Since the gate circuit is connected to the plate of the left tube in the multivibrator 360, the gate circuit can open in pulse position 48 for an integrator only when a Δx increment has actually occurred for the integrator.

A carry may be obtained in the 48th position for an integrator when a yΔx increment for the integrator is arithmetically combined with the cumulative value of the yΔx increments from the adder 319. A carry may also be obtained in the 48th position for an integrator when the information from the adder 258 in FIGURE 6 is arithmetically combined with the information in the channel 16 for the integrator. For this reason, the output from the carry circuit 320 is also introduced to the "or" network 376 for passage through the "or" network to the gate circuit 378.

The gate circuit 378 is also connected to the output terminal of the "or" network 330. As a result of this connection, a carry signal from the circuit 324 is able to pass through the gate circuit 378 in the 48th pulse position for an integrator only when the value of $Y_a$ is positive. When $Y_a$ is positive for an integrator, it is added directly into the value of the cumulative yΔx increments provided in the channel 16 for the integrator. In this way, only a positive overflow can be obtained in the cumulative yΔx value for the integrator, and this overflow is indicated by a pulse from the gate circuit 378.

The operation of the gate circuit 378 may be seen more clearly by reference to a particular example. For example, if a positive decimal number such as 596 is indicated in binary form in the channel 16 for a particular integrator and if the maximum indication that can be provided is 600, the addition of a value of +6 representing the value of $Y_a$ causes the indication in the channel 16 to return to a decimal value of +2. At the same time, the adder 322 produces a pulse for carry from the 47th position to the 48th position for the particular integrator, and this carry pulse passes through the circuit 324. Since the value of $Y_a$ is positive, the carry pulse then passes through the gate circuit 378 to indicate an overflow in the cumulative $y\Delta x$ value provided in the channel 16 for the integrator.

Because of the binary indications in the channel 16, a full indication in the cumulative $y\Delta x$ value for an integrator is provided by a pulse in the channel 16 in each of the pulse positions representing the cumulative value of $y\Delta x$ for the integrator. This represents the maximum number which can be stored in the channel 16 for each integrator. An overflow in the cumulative $y\Delta x$ value for an integrator is obtained only when a number greater than the maximum number is produced by the arithmetical combination of $Y_a$ and the cumulative $y\Delta x$ value. Upon an overflow, the indications in the channel 16 for the integrator return to an intermediate value represented by voltages indicating the value "0" for some of the pulse positions. Subsequent additions of the positive $Y_a$ indications for an integrator cause the indications in the channel 16 for the integrator to increase in value for the eventual production of another overflow.

The output from the gate circuit 378 is applied through the "or" networks 382 and 372 to the coil 46 and is recorded by the coil 46 in the channel 20. Since the gate circuit 378 passes only a signal for each integrator to indicate that an overflow has occurred in the cumulative $y\Delta x$ value stored in the channel 16 for the integrator, the channel 20 indicates in different pulse positions whether or not an overflow has occurred for each integrator the last time that the integrator was presented for computation.

The output from the gate circuit 378 is also introduced to the gate circuit 384. The gate circuit 384 also has a voltage introduced to it from the plate of the right tube in the multivibrator 318. This causes the signal from the gate circuit 378 to pass through the gate circuit 384 only when a relatively high voltage is simultaneously introduced to the gate circuit 384 from the plate of the right tube in the multivibrator 318. As previously disclosed, the voltage on the plate of the right tube in the multivibrator 318 becomes relatively high for different pulse positions to indicate the value "0" for the positions.

As disclosed in co-pending application Serial No. 217,478, the 48th pulse position for each integrator in the channel 16 is utilized to provide a code as to whether or not the cumulative $y\Delta x$ value stored in the channel 16 for the integrator is positive or negative. This code is provided in the channel 16 in pulse position 48 for each integrator at the beginning of a problem and is recirculated through the gate circuit 354 and the "or" network 356 during the actual computation. The recirculation occurs because of the connection to the gate circuit 354 from the counter 226 through the line 252. In this way, the coded information in pulse position 48 for each integrator is made available to the integrator every time that the integrator is presented for computation during the actual solution of a problem. Since the gate circuit 354 also becomes opened during pulse positions 1 to 22, inclusive, because of its connection through the line 228 to the counter 226, the gate circuit can be considered as a composite of two gate circuits and an "or" network.

In co-pending application Serial No. 217,478, a pulse is provided in the channel 16 in pulse position 48 for an integrator when the polarity of the cumulative $y\Delta x$ value stored in the channel 16 for the integrator is to be inverted. No inversion of the cumulative $y\Delta x$ value stored in the channel 16 for an integrator is to be obtained when a pulse is not provided in the channel 16 for the integrator. A similar coding is provided in this application.

In the invention disclosed herein, the gate circuit 384 opens for the passage of a pulse from the gate circuit 378 for an integrator when the polarity of the cumulative $y\Delta x$ value for the integrator is not to be inverted, as indicated by the absence of a pulse in the channel 16 in pulse position 48 for the integrator. As previously disclosed, the gate circuit 378 passes a carry pulse from the circuit 324 only when a carry occurs upon the addition of positive $Y_a$ values into the adder 322. Since the $Y_a$ value is positive and since the R value stored in the channel 16 is positive, the gate circuit 384 passes a signal to indicate that the overflow for an integrator is positive.

The signals passing through the gate circuit 384 pass through the "or" networks 388 and 375 to the coil 52 for recordation by the coil 52 in the channel 22. In this way, the pulses appearing in the channel 22 provide an indication of a positive overflow in the cumulative $y\Delta x$ value for an integrator when a pulse appears at the same time in the channel 20 to indicate that an overflow has actually occurred.

The outputs from the carry circuits 320 and 324 are also introduced to the gate circuit 380. These outputs are introduced to the gate circuit 380 through a line which causes the carry indications from the circuits 320 and 324 to appear as pulses of relatively low voltage and the absence of carry indications to appear as pulses of relatively high voltage. Because of the inversion of the output from the carry circuits 320 and 324, the gate circuit 380 can open only when a relatively low output indicative of the integer "0" is provided by both the carry circuit 320 and the carry circuit 324.

The gate circuit 380 can open only at the 48th pulse position for each integrator since it is connected through the line 252 to the counter 226. Furthermore, the gate circuit 380 can open at the 48th pulse position for an integrator only when a $\Delta x$ increment has actually been obtained for the integrator. This results from the connection between the gate circuit and the plate of the left tube in the multivibrator 360. In this way, a signal passes through the gate circuit 380 only at pulse position 48 for an integrator and only when the integrator has a $\Delta x$ increment and no carry from either the circuit 320 or the circuit 324.

Because of its connection to the "or" network 332, the gate circuit 380 opens at the 48th pulse position for an integrator only when the value $Y_a'$ appears for the integrator. When the gate circuit 380 opens, a signal passes through it and through the "or" networks 382 and 372 to the coil 46 for recordation by the coil 46 in the channel 20. The passage of a signal through the gate circuit 380 provides an indication that an overflow has occurred in the cumulative $y\Delta x$ value stored for the integrator in the channel 16. The overflow occurs as a result of the arithmetical combination of values in either the adder 319 or the adder 322. In this respect, the gate circuit 380 operates in a manner similar to the gate circuit 378.

As previously disclosed, the term $Y_a'$ is indicated by the equation $Y_a' = (-Y)(\Delta x) + (Y)(-\Delta x)$. As may be seen by either the expression $(Y)(-\Delta x)$ or the expression $(-Y)(\Delta x)$, the term $Y_a'$ for an integrator indicates that a negative number is being introduced to the adder 322 for arithmetical combination with the cumulative $y\Delta x$ value stored in the channel 16 for the integrator. Since $Y_a'$ is negative, only a negative overflow can occur in the cumulative $y\Delta x$ value for the integrator when the value of $Y_a'$ is arithmetically combined with the cumulative $y\Delta x$ value for the integrator.

As previously disclosed, a full indication of a positive number representing the cumulative $y\Delta x$ value for an integrator is obtained by a pulse of relatively high voltage for each pulse position in the channel 16 for the integrator. This corresponds to the representation of the integer "1" for each pulse position in the channel 16 for the integrator. Because of the binary presentation of numbers in the channel 16, a negative number of maximum absolute magnitude for an integrator is represented by a pulse of relatively low voltage in each pulse position for the integrator in the channel 16. This corresponds to an indication of the integer "0" for each pulse position in the channel 16 for the integrator.

Since a negative overflow in the channel 16 is obtained for an integrator when the integrator has a negative value represented by $Y_a'$, the overflow can occur only for a negative number greater in magnitude than that represented by a pulse of low voltage in each information position in the channel 16 for the integrator. Upon a negative overflow in the channel 16 for an integrator, the indications in the channel 16 for the integrator return to an intermediate value having pulses of voltage representing the integer "1" in some of the pulse positions. Subsequent additions of the negative $Y_a'$ indications for an integrator cause the indications in the channel 16 for the integrator to increased in magnitude. An increase in magnitude in a negative direction is obtained by progressively changing the pulse indications of high intensity to pulse indications of low intensity for pulse positions of increasing numerical significance.

For example, a decimal value of −596 may be indicated in binary form in the channel 16 for a particular integrator. If the maximum negative indication that can be provided as the cumulative $y\Delta x$ value for the integrator is −600, the arithmetical combination of the value of −596 and a value of −5 representing the $Y_a'$ value for the integrator causes a negative overflow to be obtained. At the same time, the circuit 324 provides a carry from the 47th pulse position to the 48th pulse position for the particular integrator to indicate that a negative overflow has occurred in the cumulative $y\Delta x$ value for the integrator. Since the overflow is negative, the circuit 324 provides an indication of the overflow by a pulse of relatively low intensity at the 48th pulse position. This corresponds to the value $D_r'$ for pulse position 48 of the integrator.

A signal passing through the gate circuit 380 at pulse position 48 for an integrator provides an indication that an overflow has occurred. The polarity of such an overflow for an integrator is determined by the presence or absence of a coding pulse in the channel 16 in pulse position 48 for the integrator. The presence of a coding pulse in position 48 for an integrator indicates that the cumulative $y\Delta x$ value stored in the channel 16 for the integrator is to be inverted in polarity. The presence of such a coding pulse is indicated by a relatively high voltage on the plate of the left tube in the multivibrator 318 at pulse position 48 for the integrator.

When a pulse is produced by the gate circuit 380 at pulse position 48 for an integrator and a pulse of relatively high voltage is simultaneously produced on the plate of the left tube in the multivibrator 318, a signal passes through the gate circuit 386. This signal indicates that the pulse passing through the gate circuit 386 represents a positive overflow in the cumulative $y\Delta x$ value for the integrator. A positive overflow is obtained because the coding pulse in the channel 16 in pulse position 48 for the integrator causes the polarity of the overflow pulse passing through the gate circuit 380 to be inverted. Since the pulse passing through the gate circuit 380 indicates a negative overflow, the inversion of such a pulse by the gate circuit 386 causes the gate circuit to indicate a positive overflow.

When a pulse passes through the gate circuit 386 to indicate a positive overflow for an integrator, it is introduced to the coil 52 after passing through the "or" networks 388 and 375. The pulse is then recorded in the channel 22 to indicate that the overflow pulse simultaneously recorded in the channel 20 is positive. In this way, the gate circuit 386 operates in a manner similar to the gate circuit 384 to indicate a positive overflow.

The operation of the gate circuit 378 may be indicated by the logical equation $Z_t = B_7 Y_a P_{48}(D_r + D_s)$. In the above equation, $B_7$ indicates a relatively high voltage on the plate of the left tube in the multivibrator 360 as previously defined and $P_{48}$ indicates pulse position 48 of each integrator. $Z_t$ indicates that a magnetic pulse representing a high voltage is recorded in the channel 20. Similarly, the operation of the gate circuit 380 is indicated by the logical equation $Z_t = B_7 P_{48} Y_a' D_r' D_s'$.

The logical equation for the operation of the gate circuit 384 may be indicated as $$Z_s = (B_7 Y_a P_{48}[D_r + D_s])(R')$$

where $Z_s$ indicates that a magnetic pulse of relatively high intensity is recorded in the channel 22. Similarly, the logical equation for the operation of the gate circuit 386 is indicated by the equation $Z_s = (B_7 P_{48} Y_a' D_r' D_s')(R)$.

It should be appreciated that a system of providing corrections in the value of the dependent quantity $y$ similar to those disclosed above can be incorporated in other digital differential analyzers than that disclosed in co-pending application Serial No. 217,478. For example, the system disclosed above can be easily adapted for use with the digital differential analyzer disclosed in co-pending application Serial No. 263,152, filed December 26, 1951, by Glenn E. Hagen et al.

It should be appreciated that the term "signal indications" as used in the claims refers to physical phenomena which take place in the digital differential analyzer, as for example, in the production of electrical signals. As disclosed in the specification and as used in the claims, the term "independent quantity" refers to the value of "$x$"—or in other words, to the quantity whose increments control the production of the $y\Delta x$ increments. The term "dependent quantity" in the claims refers to the value of $y$—or in other words, the quantity which is combined with the increments of the independent quantity. This is consistent with the terminology used in the specification. The term "differential combination" as used in the claims refers to the $y\Delta x$ increments.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A differential analyzer having a plurality of integrators, each comprising: a first register means for accumulating signal-represented variations in a dependent quantity of a mathematical function; means for forming interpolation signals representative of interpolation values intermediate the successive values accumulated in said first register upon successive injections of variations in dependent quantity; a second register means; and transfer means adapted to receive signal-represented variations in an independent quantity of said mathematical function, said transfer means functioning to register in said second register means signal-represented values proportional to the product of said interpolation values and said variations in an independent quantity upon each occurrence of said signal-represented variations in an independent quantity.

2. A differential analyzer having a plurality of integrators, each comprising: a first register means adapted to receive signal-represented variations in a dependent quantity of a mathematical function, said first register means operating to accumulate said variations in a dependent quantity to register said dependent quantity; means for forming interpolation signals representative of interpolation values intermediate the successive values accumulated in said first register means upon successive injections of variations in said dependent quantity; a second register means; and transfer means adapted to receive signal-represented variations in an independent quantity of said mathematical function, said transfer means functioning to register in said second register means signal-represented values proportional to the product of said interpolation values and said variations in an independent quantity upon each occurrence of said signal-represented variations in an independent quantity.

3. In a differential analyzer wherein a plurality of integrators function to generate solutions to mathematical problems, and wherein said integrators include first register means for registering signals indicating variations in a dependent quantity to thereby manifest values of said dependent quantity, and second register means for accumulating signals indicating the product of said dependent quantity and variations in an independent quantity, the improvement which comprises: means for developing signals representative of interpolation values of said dependent quantity, said interpolation values being intermediate the successive values manifested by said first register upon successive injections of variations in said dependent quantity; and means for developing product signals, representative of the product of said interpolation values and said variations in an independent quantity and for registering said product signals in said second register means.

4. In a differential analyzer wherein a plurality of integrators function to generate solutions to mathematical problems, and wherein said integrators include first register means for registering signals indicating variations in a dependent quantity to thereby manifest values of said dependent quantity, and second register means for accumulating signals indicating the product of said dependent quantity and variations in an independent quantity upon each occurrence of a variation in an independent quantity, the improvement which comprises: means for developing signals representative of interpolation values of said dependent quantity, said interpolation values being intermediate the successive values manifested by said first register means upon successive injections of variations in said dependent quantity at the occurrence of said variation in an independent quantity; and means for developing product signals representative of the product of said interpolation values and said variations in an independent quantity and for registering said product signals in said second register means.

5. In a differential analyzer wherein a plurality of integrators function to generate solutions to mathematical problems, and wherein said integrators include first register means for registering signals indicating variations in a dependent quantity to thereby manifest values of said dependent quantity, and second register means for accumulating signals indicating the product of said dependent quantity and variations in an independent quantity upon each occurrence of a variation in an independent quantity, the improvement which comprises: means for developing signals representative of interpolation values of said dependent quantity, said interpolation values being substantially equally intermediate the successive values manifested by said first register means upon successive injections of variations in said dependent quantity at the occurrence of said variation in an independent quantity; and means for developing product signals representative of the product of said interpolation values and said variations in an independent quantity and for registering said product signals in said second register.

6. A differential analyzer having a plurality of integrators for receiving signal-represented variations in a dependent quantity and an independent quantity of a mathematical function to perform mathematical integration wherein each of said integrators comprise: a first register means adapted to receive said signal-represented variations in a dependent quantity to thereby register a changing value of said dependent quantity; means for forming interpolation signals representative of values of said dependent quantity which are intermediate the successive values registered in said first register means upon successive injections of variations in said dependent quantity at the occurrence of said signal-represented variations in an independent quantity; a second register; and transfer means adapted to receive signal-represented variations in an independent quantity of said mathematical function, said transfer means functioning to register in said second register means signal-represented values proportional to the product of said interpolation values and said variations in an independent quantity upon each occurrence of said signal-represented variations in an independent quantity.

7. A differential analyzer having a plurality of integrators for receiving signal-represented variations in a dependent quantity and an independent quantity of a mathematical function to perform mathematical integration wherein each of said integrators comprise: a first register means adapted to receive said signal-represented variations in a dependent quantity to thereby register a changing value of said dependent quantity; means for forming interpolation signals representative of values of said dependent quantity intermediate the successive values registered in said first register means upon successive injections of variations in said dependent quantity at the occurrence of said signal-represented variations in an independent quantity; means for forming a changing signal-represented product value, varied upon each occurrence of said signal-represented variations in an independent quantity, said product value being proportional to the accumulated product of said interpolation values and said variation in an independent quantity received; and second register means for registering said signal-represented product values.

8. Apparatus according to claim 7 wherein said interpolation values are equally intermediate said values registered in said first register means.

9. Apparatus according to claim 7 wherein said register means comprise, a moving magnetic medium having transducer means for recording electrical signals upon said medium and sensing electrical signals therefrom.

10. Apparatus according to claim 7 further including, means for forming output signals when the content of said second register means reaches a predetermined value.

11. Apparatus according to claim 10 wherein said differential analyzer further includes, a third register means for registering said output signals to thereby provide said output signals available to certain of said integrators.

12. A differential analyzer having a plurality of integrators for receiving signals representative of variations in a dependent quantity of a mathematical function, and signals representative of variations in an independent quantity of said mathematical function, wherein said integrators function ot perfor mmathematical integration, and wherein said integrators comprise: a first register means adapted to receive said signals representative of variations in a dependent quantity to thereby register a varying value of said dependent quantity; interpolation means for forming signals representative of interpolation values of said dependent quantity, said interpolation values being intermediate the successive values registered in said first register means upon successive injections of variations in said dependent quantity at the occurrence of said signals representative of variations in an independent quantity; a second register means; and transfer means adapted to receive said signals representative of variations in an independent quantity and connected to said second register means and said interpolation means for registering signals representative of the product of said interpolation values and said variations in an independent quantity in said second register means upon each occurrence of said signals representing a variation in said independent quantity.

13. Apparatus according to claim 12 wherein said transfer means comprises: means for combining said signals representative of a variation in an independent quantity, said signals in said first register, and said signals representative of interpolation values, to provide signals representative of an accumulated value of the products of the variations in an independent quantity and a dependent quantity; and means for registering said signals representative of an accumulated value in said second register.

14. A differential analyzer having a plurality of integrators for receiving signals representative of variations in a dependent quantity of a mathematical function, and signals representative of variations in an independent quantity of said mathematical function, wherein said integrators function to perform mathematical integration, and wherein said integrators comprise: a first register means adapted to receive said signals representative of variations in a dependent quantity to thereby register a varying value of said dependent quantity; second register means adapted to receive said signals representative of variations in an independent quantity; third register means; means for combining the content of said third register means, the content of said first register means, and a fraction of the content of said second register means upon each occurrence of said signals representative of variations in an independent quantity, to thereby form signals representative of the accumulation of products of said dependent and independent quantities; means for clearing said second register after said combination is effected and means for registering said signals representative of the accumulation of products in said third register.

15. A differential analyzer having a plurality of integrators for receiving signals representative of variations in a dependent quantity of a mathematical function, and signals representative of variations in an independent quantity of said mathematical function, wherein said integrators function to perform mathematical integration, and wherein said integrators comprise: a first register means adapted to receive said signals representative of variations in a dependent quantity to thereby register a varying value of said dependent quantity; second register means adapted to receive said signals representative of variations in an independent quantity; third register means; means for forming first product signals representative of a fraction of the product of the content of said second register and said variations in an independent quantity; means for forming second product signals representative of the product of the content of said first register means and said variations in an independent quantity; means for algebraically combining said first product signals, said second product signals, and the content of said third register to form signals representative of the accumulation of products of said dependent and said independent quantities; means for clearing said second register after said combination is effected; and means for registering said signals representative of the accumulation of products in said third register means.

16. Apparatus according to claim 15 wherein said fraction is substantially one-half.

References Cited in the file of this patent

UNITED STATES PATENTS

| 2,398,238 | McNatt | Apr. 9, 1946 |
| 2,701,095 | Stibitz | Feb. 1, 1955 |
| 2,737,342 | Nelson | Mar. 6, 1956 |
| 2,770,797 | Hamilton | Nov. 13, 1956 |
| 2,772,050 | Robinson | Nov. 27, 1956 |
| 2,850,232 | Hagen et al. | Sept. 2, 1958 |

FOREIGN PATENTS

| 507,259 | Belgium | Dec. 15, 1951 |
| 1,055,460 | France | May 5, 1952 |
| 745,816 | Great Britain | Mar. 7, 1956 |

OTHER REFERENCES

"A New Type of Differential Analyzer," by Bush and Caldwell, Journal of the Franklin Institute, vol. 240, No. 4, October 1945, pages 255–326.

Mathematical Tables and Other Aids to Computation, vol. VI, No. 37 (MTAC-2), pages 41 to 53, January 1952.

Mathematical Tables and Other Aids to Computation, vol. VI, No. 38 (MTAC-1), April 1952 (pages 102–112).

Palevsky: The Design of the Bendix Digital Differential Analyzer, Proc. of the I.R.E., October 1953, pages 1352 to 1356.